(12) United States Patent
Shirai et al.

(10) Patent No.: US 6,246,949 B1
(45) Date of Patent: Jun. 12, 2001

(54) APPARATUS FOR CALCULATING DEFLECTION OF CENTRAL AXIS OF AN OBSTACLE DETECTING APPARATUS MOUNTED ON A VEHICLE AND APPARATUS FOR CORRECTING THE DEFLECTION OF CENTRAL AXIS, AND SYSTEM FOR CONTROLLING DISTANCE TO A PRECEDING VEHICLE TRAVELING AHEAD

(75) Inventors: Noriaki Shirai, Oobu; Katsuhiko Hibino, Kariya; Takao Nishimura, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 08/780,092

(22) Filed: Dec. 27, 1996

(30) Foreign Application Priority Data

Dec. 27, 1995 (JP) .................................................. 7-341668
Oct. 21, 1996 (JP) .................................................. 8-278233

(51) Int. Cl.[7] ................................................. G06F 165/00
(52) U.S. Cl. ............................... 701/96; 701/301; 342/70
(58) Field of Search ....................... 701/96, 301; 356/28; 342/69, 70; 250/208

(56) References Cited

U.S. PATENT DOCUMENTS

| 5,461,357 | 10/1995 | Yoshioka et al. | 340/435 |
|---|---|---|---|
| 5,604,580 | * 2/1997 | Uehara | 356/28 |
| 5,745,870 | * 4/1998 | Yamamoto et al. | 701/301 |
| 5,767,803 | * 6/1998 | Yamada | 342/69 |

FOREIGN PATENT DOCUMENTS

| 0 443 643 | 8/1991 | (EP) . |
|---|---|---|
| 0 514 343 | 11/1992 | (EP) . |
| 5-157843 | 6/1993 | (JP) . |
| 6-290398 | 10/1994 | (JP) . |
| 7-209414 | 8/1995 | (JP) . |
| 7-262 498 | 10/1995 | (JP) . |
| 7-262499 | 10/1995 | (JP) . |
| 8-279099 | 10/1995 | (JP) . |
| 7-291063 | 11/1995 | (JP) . |
| 7-294634 | 11/1995 | (JP) . |
| 7-296298 | 11/1995 | (JP) . |
| 7-318652 | 12/1995 | (JP) . |

* cited by examiner

Primary Examiner—William A. Cuchlinski, Jr.
Assistant Examiner—Arthur Donnelly
(74) Attorney, Agent, or Firm—Pillsbury Madison & Sutro LLP

(57) ABSTRACT

The present invention aims to facilitate easy correction of the center axis of an obstacle detecting apparatus for a vehicle by calculating deflection of the center axis with respect to the vehicle. Each of most obstacles recognized as moving objects is a preceding vehicle 93, and when the subject vehicle 91 is moving straight, the preceding vehicle 93 is detected in a position straight ahead of the subject vehicle 91. If the optical axis 95 of the transmitting/receiving section 31 is oriented straight ahead of the subject vehicle 91, the preceding vehicle 93 will be detected on the optical axis 95. On the other hand, when the optical axis 95 deviates from the center axis of the vehicle, the preceding vehicle 93 is detected in a position deviated from the optical axis 95 by an angle θ m. In this case, the value θ of deflection of optical axis 95 is equal to −θ m. In addition, by determining whether or not the relative velocity vector component of an obstacle is within a given range, the accuracy of calculation can be bettered with data of vehicles moving in an adjacent lane and data of vehicles moving along a curve being removed.

19 Claims, 14 Drawing Sheets

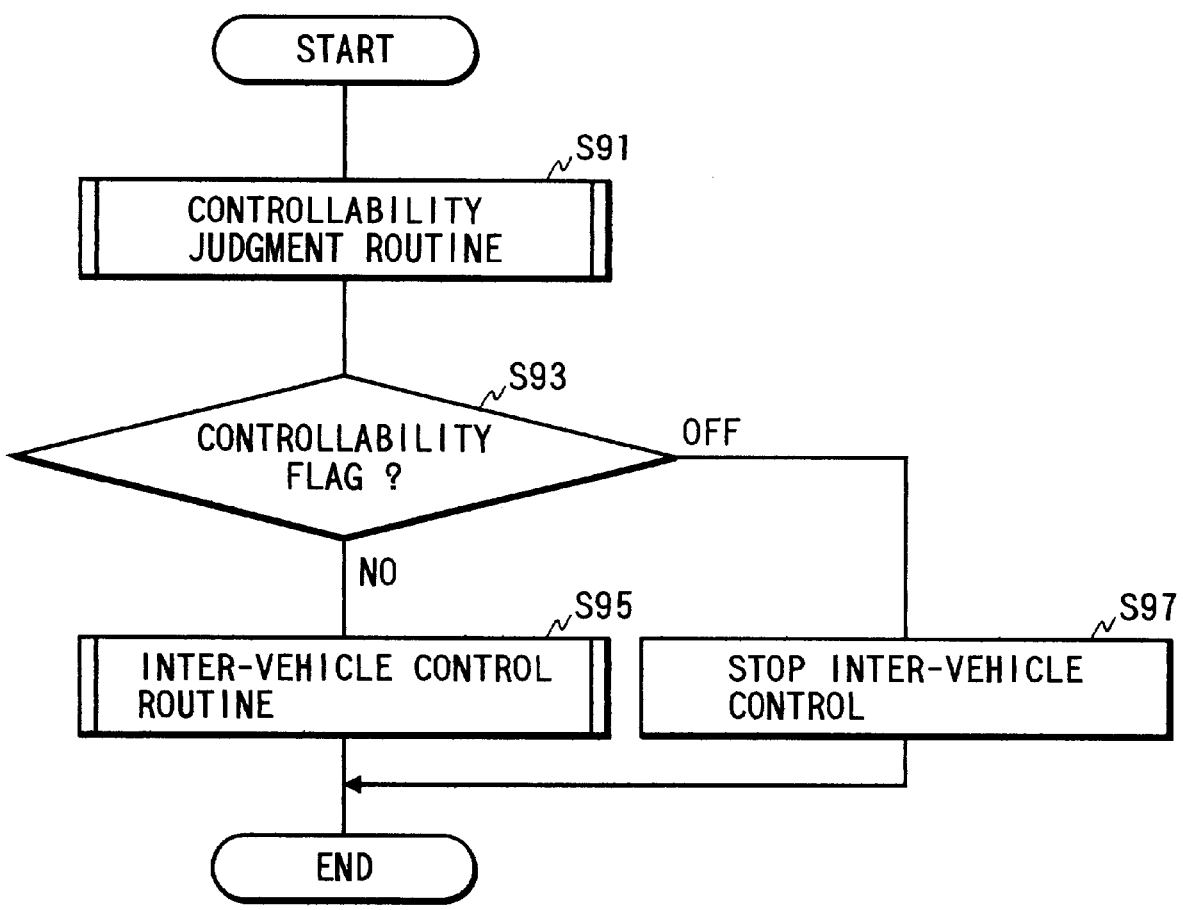

ND AXIS OF AN
OBSTACLE DETECTING APPARATUS
MOUNTED ON A VEHICLE AND
APPARATUS FOR CORRECTING THE
DEFLECTION OF CENTRAL AXIS, AND
SYSTEM FOR CONTROLLING DISTANCE
TO A PRECEDING VEHICLE TRAVELING
AHEAD

BACKGROUND OF THE INVENTION

1. Field of the Invention

The present invention relates to an apparatus for calculating how much a central axis of an obstacle detecting apparatus for a vehicle deflects from the centerline of the vehicle along a longitudinal direction, in which the obstacle detecting apparatus is mounted on the vehicle and serves to radiate a transmission wave over a given angular range from a given central axis to the width direction of the vehicle for detecting a distance to and an angle of an obstacle in response to a reflected wave from the obstacle. The invention also relates to a deflection of central axis correcting apparatus for correcting the deflection of central axis of the obstacle detecting apparatus. Further, the invention relates to an inter-vehicle distance control system for controlling a distance between a system vehicle equipped with the system and a vehicle ahead of the system vehicle on the basis of the central axis of the obstacle detecting apparatus the deflection of which has been corrected.

2. Description of the Related Art

An obstacle detecting apparatus is designed to be mounted on a vehicle and to serve to radiate a transmission wave, such as an optical wave or an electromagnetic wave, over a forward detection zone defined by a given angle to the width direction of the vehicle for detecting a distance to and an angle of an obstacle such as a preceding vehicle on the basis of a reflected wave from the obstacle. This type of obstacle detecting apparatus is used in an inter-vehicle distance control system for detecting a preceding vehicle ahead of a system vehicle equipped with the system and holding a distance between the vehicles at a constant value, or in a warning control system for issuing an alarm when the system vehicle moves into proximity to an obstacle.

Such an obstacle detecting apparatus must be mounted on a vehicle such that the central axis of the apparatus is exactly in line with the centerline of the vehicle along the longitudinal direction. If the control axis deviates from the center line, an error in detecting an angle of the obstacle appears. In this case, the obstacle detecting apparatus may recognize a vehicle traveling along an adjacent lane as the preceding vehicle, or it may recognize the preceding vehicle as an object other than the preceding vehicle.

However, a highly accurate adjustment is required to put the central axis of the obstacle detecting apparatus exactly in line with the centerline of the vehicle along the longitudinal direction, and therefore a problem arises because this installation takes a significant amount of time.

SUMMARY OF THE INVENTION

It is an object of the present invention to provide an improved apparatus for calculating a deflection of central axis of an obstacle detecting apparatus relative to a vehicle equipped with the system and, to facilitate correction of central axis of the obstacle detecting apparatus.

In order to achieve the above object, a first aspect of the present invention provides a deflection of central axis calculating apparatus which is used for an obstacle detecting apparatus mounted on a vehicle, the obstacle detecting apparatus serving to radiate a transmission wave over a given angular range along a central axis thereof for detecting a distance to and an angle of an obstacle, and which comprises, as shown in FIG. 15A, object recognizing means for determining whether the obstacle is a stationary object or a moving object on the basis of the distance to and angle of the obstacle detected by the obstacle detecting apparatus; speed calculating means for calculating a vector representing a speed of the obstacle relative to the vehicle; and first deflection calculating means, when a target obstacle is selected from among obstacles detected by the obstacle detecting apparatus under conditions that the target obstacle has been recognized as a moving object by the object recognizing means and the relative speed thereof calculated by the speed calculating means falls within a given range, which calculates the deflection of central axis of the obstacle detecting apparatus relative to the vehicle on the basis of the angle of the target obstacle.

In the deflection of central axis calculating apparatus according to the first aspect of the present invention, the speed calculating means calculates a speed vector of the obstacle relative to the vehicle on the basis of changes in the distance to and angle of the obstacle detected by the obstacle detecting apparatus. The first deflection calculating means calculates a deflection of central axis of the obstacle detecting apparatus relative to the vehicle on the basis of the angle of the target obstacle detected by the obstacle detecting apparatus. As previously described, the target obstacle is selected from among obstacles detected by the obstacle detecting apparatus under conditions that the target obstacle has been recognized as a moving object by the object recognizing means and the components of the vector representing the speed of the target obstacle relative to the vehicle and calculated by the speed calculating means falls within the given range.

In most cases the obstacle recognized as a moving object by the object recognizing means is a preceding vehicle. In the case where a subject vehicle equipped with the obstacle detecting apparatus maintains a constant distance to a preceding vehicle ahead of the subject vehicle, when the subject vehicle and the preceding vehicle travel together along a straight section of a road, the relative position between both vehicles hardly changes. In this case, the preceding vehicle is detected straight ahead of the subject vehicle. Therefore, the first deflection calculating means calculates the deflection of central axis of the obstacle detecting apparatus on the basis of the angle of the target obstacle detected by the object detecting apparatus as long as the target obstacle is estimated to be the preceding vehicle. For example, if the detected angle of the target obstacle is directed to the forward direction of the subject vehicle, the central axis of the obstacle detecting apparatus is regarded as not deflecting, so that the deflection value becomes zero. On the other hand, if the angle deviates from the forward direction of the subject vehicle, the central axis is regarded as deflecting by an angle represented by the deviation.

The deflection of central axis calculating apparatus is able to calculate the deflection of central axis of the obstacle detecting apparatus relative to the subject vehicle and to facilitate correction of the central axis of the obstacle detecting apparatus. Specifically, in the deflection of central axis calculating apparatus according to the first aspect of the present invention, the deflection of central axis of the obstacle detecting apparatus relative to the subject vehicle is calculated from only data related to the target obstacle (preceding vehicle), which is selected from among obstacles detected by the obstacle detecting apparatus under conditions that the preceding vehicle has a vector of a relative speed the components of which fall within the given range, so that other data related to moving objects other than the preceding vehicle and data representing the preceding vehicle during cornering, can be eliminated properly, thereby improving the accuracy in calculating the deflection.

The given range may be defined for one of the components of the vector representing the speed of the target obstacle relative to the subject vehicle, for each of the components, or for a norm.

A second aspect of the present invention provides a deflection of central axis calculating apparatus which is used for an obstacle detecting apparatus mounted on a vehicle, the obstacle detecting apparatus serving to radiate a transmission wave over a given angular range along a central axis thereof for detecting a distance to and an angle of an obstacle, and which comprises, as shown in FIG. 15B, object recognizing means for determining whether the obstacle is a stationary object or a moving object on the basis of changes in distance to and angle of the obstacle detected by the obstacle detecting apparatus; speed calculating means for calculating a vector representing a speed of the obstacle relative to the vehicle; and second deflection calculating mean, when a target obstacle is selected from among obstacles detected by the obstacle detecting apparatus under conditions that the target obstacle has been recognized as a stationary object by the object recognizing means and the distance thereto detected by the obstacle detecting apparatus is less than a given value, which calculates the deflection of central axis of the obstacle detecting apparatus relative to the vehicle on the basis of the direction of the vector representing the relative speed of the target obstacle calculated by the speed calculating means.

In the deflection of central axis calculating apparatus according to the second aspect of the present invention, the second deflection calculating means calculates a deflection of central axis of the obstacle detecting apparatus on the basis of the direction of the vector representing the speed of the target obstacle relative to the vehicle calculated by the speed calculating means, the target obstacle being selected from among obstacles detected by the obstacle detecting apparatus under conditions that the target obstacle has been recognized as a stationary object by the object recognizing means and the distance thereto detected by the obstacle detecting apparatus is less than the given value.

The vector representing the speed of the stationary object relative to the vehicle has a direction parallel to the longitudinal (forward) direction of the vehicle. Therefore, the second deflection calculating means calculates the deflection of central axis of the obstacle detecting apparatus on the basis of the direction of the vector representing the speed of the target obstacle (corresponding to the stationary object) relative to the vehicle. For example, if the vector of the relative speed calculated by the speed calculating means is in parallel to the longitudinal direction, the central axis of the obstacle detecting apparatus is regarded as not deflecting, so that the deflection value becomes zero. On the other hand, if the direction deviates from the longitudinal direction of the vehicle, the central axis is regarded as deflecting by an amount of deviation. Accordingly, the deflection of central axis calculating apparatus is able to calculate the deflection of central axis of the obstacle detecting apparatus relative to the vehicle and, to facilitate correction of the central axis of the obstacle detecting apparatus.

When the vehicle travels straight along a road, the vector of the speed of the stationary object relative to the vehicle is completely in parallel to the longitudinal direction of the vehicle. On the other hand, when the vehicle has entered a curve, the farther the stationary object is from the vehicle, the larger the angle between the longitudinal direction of the vehicle and the direction represented by the vector of the relative speed of the stationary object. Therefore, the second deflection calculating means calculates the central axis of the obstacle detecting apparatus from only data related to the obstacle (stationary object) the distance of which is less than the given value, so that the calculation of the deflection can be made with a remarkably high accuracy.

A third aspect of the present invention is based on the first aspect of the present invention, and provides a deflection of central axis calculating apparatus which further comprises third deflection calculating means, when a target obstacle is selected from among obstacles detected by the obstacle detecting apparatus under a condition that the target obstacle has been recognized as a stationary object by the object recognizing means, which calculates the deflection of central axis of the obstacle detecting apparatus relative to the vehicle on the basis of the direction of the vector representing the relative speed of the target obstacle calculated by the speed calculating means.

As previously described, the direction of the vector representing the speed of the stationary object relative to the vehicle is in parallel to the longitudinal (forward) direction of the vehicle. Therefore, the third deflection calculating means calculates the deflection of the central axis of the obstacle detecting apparatus on the basis of the direction of the vector representing the speed of the target obstacle (corresponding to the stationary object) relative to the vehicle.

The use of the third deflection calculating means allows calculating the deflection of the central axis of the obstacle detecting apparatus even when no moving object such as preceding vehicle is present. In contrast, when a plurality of vehicles travels ahead of the subject vehicle, and no stationary object such as road-side thing can be detected because such a stationary object is hidden by the vehicles ahead of the subject vehicle, the first deflection calculating means calculates the deflection of the central axis of the obstacle detecting apparatus. Thus, the deflection of central axis calculating apparatus according to the third aspect of the present invention can calculate the deflection of the central axis in most cases irrespective of the road conditions, and this gives an advantage over the apparatus according to the first aspect of the present invention.

In addition, the second deflection calculating means according to the second aspect of the present invention is one form of the third deflection calculating means. The third deflection calculating means has a wider range of selection of a target obstacle than the second deflection calculating means, in which the target object is selected irrespective of the distance to the target obstacle.

A fourth aspect of the present invention is based on the first or third aspect of the present invention, and provides a deflection of central axis calculating apparatus, wherein when a target obstacle is selected, from among obstacles continuously detected for a given time period or more by the obstacle detecting apparatus, under conditions the target obstacle has been recognized as a moving object by the object recognizing means and the components of the vector representing the relative speed thereof calculated by the speed calculating means falls within a given range, the first deflection calculating means calculates the deflection of central axis of the obstacle detecting apparatus relative to the vehicle on the basis of the angle of the target obstacle detecting by the obstacle detecting apparatus. That is, in addition to the conditions of the first deflection calculating means according to the first or third aspect of the present invention that (1) the target obstacle is a moving object and (2) the components of the vector representing the relative speed falls within the given range, the first deflection calculating means according to the fourth aspect of the present invention further includes a condition that (3) the target obstacle has been continuously detected for the given time period or more.

The first deflection calculating means according to the fourth aspect of the present invention allows calculating the deflection of central axis of the obstacle detecting means from only data related to a preceding vehicle traveling ahead of the subject vehicle for a long time without taking into account other data related to moving objects temporarily detected (e.g., a vehicle traveling along an adjacent lane). Therefore, the deflection of central axis calculating apparatus according to the fourth aspect of the present invention can improve the accuracy in calculating the deflection Sore than the apparatus according to the first or third aspect of the present invention.

A fifth aspect of the present invention is based on any one of the first, third and fourth aspects of the present invention, and provides a deflection of central axis calculating apparatus which further comprises width calculating means for calculating a width of an obstacle on the basis of the distance to and angle of the obstacle detected by the obstacle detecting apparatus, wherein when a target obstacle is selected from among obstacles detected by the obstacle detecting apparatus under conditions that the target obstacle has been recognized as a moving object by the object recognizing means, the components of the vector representing the relative speed thereof calculated by the speed calculating means falls within a given range, and the width thereof calculated by the width calculating means falls within a given range, the first deflection calculating means calculates the deflection of central axis of the obstacle detecting apparatus relative to the vehicle on the basis of the angle of the target obstacle detected by the obstacle detecting apparatus. In other words, the first deflection calculating means according to the fifth aspect of the present invention further includes a condition that the width of the target obstacle is a given width or narrower in addition to the conditions of the first deflection calculating means according to any one of the first, third and fourth aspect of the present invention.

In general, two reflectors are provided on the rear of a vehicle such as a private car or a passenger car. In the case where the width calculating means detects and recognizes a distance between the reflectors as the width of the obstacle (preceding vehicle), when one of the reflectors of the preceding vehicle is dirty, the width of the preceding vehicle may be calculated narrower than the actual width. Similarly, in the case where the obstacle detecting apparatus detects a two-wheeled vehicle such as a bike, the width of the obstacle becomes narrow. In both cases, the center of the obstacle tends to deviate left or right from the center of the lane. Such data are inappropriate for calculating the deflection of central axis of the obstacle detecting apparatus. It is therefore desirable to leave the data out of consideration. In contrast, in the case where the obstacle detecting means detects and recognizes a preceding vehicle on the subject vehicle's lane and a preceding vehicle on an adjacent lane as an obstacle, the width of the obstacle calculated by calculating means becomes wide. In this case, the center of the obstacle deviates from the center of the subject vehicle's lane toward the adjacent lane. It is therefore desirable to leave the data out of consideration as well.

To avoid such situations, the first deflection calculating means according to the fifth aspect of the present invention uses a target obstacle as a criterion, which is a moving object and the width of which is within a given range (e.g., a range of generally accepted vehicle widths including typical cars), so that the data, such as data related to a two-wheeled vehicle, data related to a vehicle one reflector of which cannot be detected, and data related to a vehicle traveling along the adjacent lane, can be eliminated properly from the data related to the target obstacle. Therefore, the deflection of central axis calculating apparatus according to the fifth aspect of the present invention can improve the accuracy in calculating the deflection more than the apparatus according to any one of the first, third and fourth aspects of the present invention.

A sixth aspect of the present invention is based on any one of the first, third, fourth and fifth aspects of the present invention, and provides a deflection of central axis calculating apparatus which further comprises average value calculating means for calculating a mean or average value of a plurality of deflections of central axis each of which is individually calculated as a result of plural calculation cycles of the first deflection calculating means; standard deviation calculating means for calculating a standard deviation of the plurality of deflections; and a deflection evaluating means for evaluating the average value of the plurality of deflections to be a reliable value for the deflection of central axis of the obstacle detecting apparatus relative to the vehicle when the standard deviation of the plurality of deflections is smaller than a given value and the number of deflections upon which the average value and the standard deviation are calculated is a given number or more, or for evaluating the value of each deflection and the average value of the plurality of deflections to be unreliable values when the standard deviation is the given value or larger and the number of deflections is less than the given number.

In the case where the first deflection calculating means calculates the deflections individually as a result of plural calculation cycles, when the number of deflections is many enough and the standard deviation is small enough, the average value of the deflections is regarded as close enough to an actual deflection. Therefore, the deflection evaluating means evaluates the average value of the deflections to be a reliable value for the deflection of central axis of the obstacle detecting apparatus relative to the vehicle when the standard deviation of the plurality of deflections is smaller than the given value and the number of deflections is the given number or more. On the other hand, the deflection evaluating means evaluates the value of each deflection and the average value of the deflections to be unreliable values when the standard deviation is the given value or larger and the number of deflections is less than the given number. Accordingly, the deflection of central axis calculating apparatus according to the sixth aspect of the present invention can improve the accuracy in calculating the deflection more than the apparatus according to any one of the first, third, fourth and fifth aspects of the present invention. In addition, the deflection evaluating means allows determining, on the basis of the result of evaluation, whether or not the calculated deflection is should be considered in control processes such as a control process of correcting the central axis of the obstacle detecting apparatus, thereby properly improving reliability of the control.

A seventh aspect of the present invention provides a deflection of central axis calculating apparatus including the second deflection calculating means or the third deflection calculating means as set forth in any one of the second through sixth aspects of the present invention, which further comprises average value calculating means for calculating a mean or average value of a plurality of deflections of central axis each of which is individually calculated as a result of plural calculation cycles of the second or third deflection calculating means; standard deviation calculating means for calculating a standard deviation of the plurality of deflections; and deflection evaluating means for evaluating the average value of the plurality of deflections to be a reliable value for the deflection of central axis of the obstacle detecting apparatus relative to the vehicle when the standard deviation is smaller than a given value and the number of deflections upon which the average value and the standard deviation are calculated is a given number or more, or for evaluating the value of each deflection and the average value of the plurality of deflections to be unreliable values when the standard deviation is the given value or larger and the number of deflections is less than the given number.

As configured such above, the deflection of central axis calculating apparatus according to the seventh aspect of the present invention can improve the accuracy in calculating the deflection more than the apparatus according to any one of the second through sixth aspects of the present invention each of which includes the second deflection calculating means or the third deflection calculating means. In addition, the deflection evaluating means allows determining, on the basis of the result of evaluation, whether or not the calculated deflection should be considered in control processes such as a control process of correcting the central axis of the obstacle detecting apparatus, thereby properly improving reliability of the control.

An eighth aspect of the present invention provides a deflection of central axis calculating apparatus including both the first deflection calculating means and the third deflection calculating means as set forth in any one of the third through seventh aspects of the present invention, wherein when an absolute value of the deflection calculated by the third deflection calculating means is a given value or larger, the value of the deflection calculated by the first deflection calculating means is neglected.

The first deflection calculating means detects a preceding vehicle on the assumption that the preceding vehicle travels along the subject vehicle's lane. Therefore, in the case where the deflection of central axis of the obstacle detecting apparatus is so large that the subject vehicle's lane deviates from the detection zone of the obstacle detecting apparatus, the obstacle detecting apparatus cannot detect any preceding vehicle, and hence the first deflection calculating means cannot determine the deflection of central axis of the obstacle detecting apparatus, or may determine an error value of the deflection on the basis of data related to a vehicle traveling along the adjacent lane. On the contrary, the third deflection calculating means is able to determine the reliable value of the deflection as long as the obstacle detecting apparatus detects at least one stationary object present on the left or right side of the road even if the deflection of central axis of the obstacle detecting apparatus is too large to detect an obstacle or obstacles on the subject vehicle's lane.

For this reason, the deflection of central axis calculating apparatus according to the eighth aspect of the present invention neglects the value of the deflection calculated by the first deflection calculating means when the value of the deflection calculated by the third deflection calculating means is the given value or larger, and this makes it possible to calculate the deflection accurately even when the deflection of central axis of the obstacle detecting apparatus is relatively large. Accordingly, the deflection of the central axis calculating apparatus according to the eighth aspect of the present invention can improve the accuracy in calculating the deflection more than the apparatus according to any one of the third through seventh aspects of the present invention each of which includes both the first deflection calculating means and the third deflection calculating means.

A ninth aspect of the present invention is based on any one of the first through eighth aspects of the present invention, and provides a deflection of central axis calculating apparatus which further comprises straight advancement determining means for determining whether or not the vehicle is traveling straight, wherein the first, second or third deflection calculating means calculates the deflection only when the straight advancement determining means determines that the vehicle is traveling straight. In other words, a condition, provided by the straight advancement determining means, whether or not the vehicle is traveling straight, is added to the deflection calculating conditions upon which the deflection is calculated by the first, second or third deflection calculating means according to any one of the first through eighth aspects of the present invention.

If the subject vehicle is traveling straight, a moving object or preceding vehicle will be present straight ahead of the subject, while a vector representing the speed of a stationary object relative to the subject vehicle will have a direction exactly equal to the forward direction of the subject vehicle. Therefore, the deflection of central axis calculating apparatus according to the ninth aspect of the present invention can improve the accuracy in calculating the deflection more than the apparatus according to any one of the first through eighth aspects of the present invention.

A tenth aspect of the present invention provides an apparatus for correcting a deflection of central axis of an obstacle detecting apparatus, which comprises angle correcting means for correcting the angle of the obstacle detected by the obstacle detecting apparatus on the basis of the value of the deflection calculated by the deflection of central axis calculating apparatus of any one of the first through ninth aspects of the present invention.

In the deflection of central axis correcting apparatus according to the tenth aspect of the present invention, the angle correcting means corrects the angle of the obstacle relative to the vehicle detected by the obstacle detecting apparatus on the basis of the value of the deflection calculated by the deflection of central axis calculating apparatus, so that the central axis of the obstacle detecting apparatus can be adjusted substantially to the centerline of the vehicle along the longitudinal direction, thereby improving the accuracy in control processes such as an inter-vehicle distance control process and a warning control process.

An eleventh aspect of the present invention is based on the tenth aspect of the present invention, and provides a deflection of central axis correcting apparatus, wherein the obstacle detecting apparatus comprises transmitting means for radiating a transmission wave every given angle in a scanning manner; receiving means for receiving a reflected wave from an obstacle; distance calculating means for calculating a distance to the obstacle on the basis of an interval of time between the moment of transmission of the transmission wave by the transmitting means and the moment of reception of the reflected wave by the receiving means; and storage means for storing data representing the distance to the obstacle provided by the distance calculating means with maintaining the one-to-one correspondence between the distance to the obstacle and the angle of radiation at which the corresponding transmission wave is radiated, such that the angle correcting means corrects the angle of the obstacle relative to the vehicle by changing the correspondence or the relation between the distance to the obstacle and the angle of radiation stored in the storage means.

In this type of obstacle detecting apparatus, the data representing the distance to the obstacle is stored in the storage means in correspondence with data representing the angle of radiation, so that the distance to and angle of the obstacle can be detected on the basis of both data. Further, the angle of the obstacle can be easily corrected in a simple process such as a process of changing the correspondence or the relation by means of data shift or the like. The angle correcting means thus corrects the angle of the obstacle relative to the vehicle by changing the correspondence or the relation. Accordingly, the deflection of central axis correcting apparatus according to the eleventh aspect of the present invention can simplify and speed up the data processing to be executed by the angle correcting means more than the apparatus according to the tenth aspect of the present invention.

A twelfth aspect of the present invention is based on the tenth or eleventh aspect of the present invention, and provides a deflection of central axis correcting apparatus which further comprises coordinate transforming means for transforming the distance to and angle of the obstacle detected by the obstacle detecting apparatus into a position of orthogonal coordinates by solving a given equation for coordinate transformation, such that the angle correcting means corrects the angle of the obstacle relative to the vehicle by changing or alternating the equation for coordinate transformation provided by the coordinate transformation means.

The coordinate transformation means determines a position of the obstacle on the plane of the orthogonal coordinates by solving the distance to and angle of the obstacle (i.e., polar coordinates) according to the given equation. In such a coordinate transformation, the angle of the obstacle relative to the vehicle can be changed in the orthogonal coordinate system by changing or alternating the given equation. Therefore, the deflection of central axis correcting apparatus according to the twelfth aspect of the present invention can correct the angle of the obstacle relative to the vehicle more accurately than the apparatus according to the tenth or eleventh aspect of the present invention.

A thirteenth aspect of the present invention provides an inter-vehicle distance control system which includes an obstacle detecting apparatus for a vehicle serving to radiate a transmission wave over a given angular range along the central axis thereof for detecting a distance to and an angle of an obstacle; preceding vehicle selecting means for selecting a preceding vehicle from among obstacles detected by the obstacle detecting apparatus, the preceding vehicle corresponding to a target obstacle for which inter-vehicle distance control should be executed; and inter-vehicle distance control means for controlling the speed of the subject vehicle equipped with the system to hold a distance between the subject vehicle and the preceding vehicle selected by the preceding vehicle selecting means; the inter-vehicle distance control system comprising: an apparatus for calculating a deflection of central axis according to any one of the first through ninth aspects of the present invention, which cal-
culates a deflection of central axis of the obstacle detecting apparatus; and control condition changing means for changing the control condition of the inter-vehicle distance control means on the basis of the value of the deflection calculated by the deflection of central axis calculating apparatus.

In the inter-vehicle distance control system according to the thirteenth aspect of the present invention, the preceding vehicle selecting means selects a preceding vehicle, for which the inter-vehicle distance control should be executed, from among obstacles detected by the obstacle detecting apparatus. The inter-vehicle distance control means then adjusts the speed of the subject vehicle to control a distance to the preceding vehicle selected by the preceding vehicle selecting means so that the subject vehicle can travel with maintaining a constant distance to the preceding vehicle.

Further, the deflection of central axis calculating apparatus calculates the deflection of central axis of the obstacle detecting apparatus, while the control condition changing means changes the control condition of the inter-vehicle distance control means on the basis of the value of the deflection calculated by the deflection of central axis calculating apparatus. Therefore, even when the central axis of the obstacle detecting apparatus deflects from the centerline of the subject vehicle along the longitudinal direction, the control condition changing means prevents the deflection of central axis from being used directly as a condition for inter-vehicle distance control, so that the control safety can be improved. As previously described, the control condition can be changed by correcting the angle of the obstacle relative to the subject vehicle. The control condition may be also changed by changing acceleration or deceleration, as described later, or by keeping the distance between vehicles long.

A fourteenth aspect of the present invention is based on the thirteenth aspect of the present invention, and provides an inter-vehicle distance control system, wherein the control condition changing means changes the value of acceleration/deceleration of the subject vehicle to be adjusted by the inter-vehicle distance control means in response to the value of the deflection calculated by the deflection of central axis calculating apparatus.

The condition changing means according to the fourteenth aspect of the present invention prevents the deflection of central axis from being directed used as a value of the acceleration/deceleration of the subject vehicle. Therefore, the inter-vehicle distance control system according to the fourteenth aspect of the present invention can improve the control safety more than the system according to the thirteenth aspect of the present invention. In addition, the value of the acceleration/deceleration of the subject vehicle may be changed by reducing the value of the acceleration/deceleration of the subject vehicle, as described later, or by correcting or directing the value of the acceleration/deceleration of the subject vehicle to the decelerated side as a whole.

A fifteenth aspect of the present invention is based on the fourteenth aspect of the present invention, and provides an inter-vehicle distance control system, wherein the control condition changing means reduces the value of the acceleration/deceleration of the subject vehicle to be adjusted by the inter-vehicle distance control means in response to the value of the deflection calculated by the deflection of central axis calculating apparatus.

In the case where the central axis of the obstacle detecting apparatus deflects from the centerline of the subject vehicle along the longitudinal direction, the control condition changing means is able to reduce the value of the acceleration/deceleration of the subject vehicle to be adjusted by the inter-vehicle distance control means. The control condition changing means allows preventing the subject vehicle from being excessively accelerated or decelerated in response to the value of the deflection of central axis of the obstacle detecting apparatus, so that the subject vehicle can continue to travel stably. Therefore, the inter-vehicle distance control system according to the fifteenth aspect of the present invention can improve the safety more than the system according to the fourteenth aspect of the present invention.

A sixteenth aspect of the present invention is based on the thirteenth aspect of the present invention, and provides an inter-vehicle distance control system, wherein the control condition changing means stops the control processing to be executed by the inter-vehicle distance control means in response to the value of the deflection calculated by the deflection of central axis calculating apparatus.

In the case where the central axis of the obstacle detecting apparatus deflects from the centerline of the subject vehicle along the longitudinal direction, the control condition changing means is able to stop the control processing to be executed by the inter-vehicle distance control means. Therefore, the inter-vehicle distance control system according to the sixteenth aspect of the present invention can improve the safety more than the system according to the thirteenth aspect of the present invention.

A seventeenth aspect of the present invention is based on the sixteenth aspect of the present invention, and provides an inter-vehicle distance control system which further comprises sudden-change detecting means for detecting a sudden change in deflection of central axis of the obstacle detecting apparatus, such that the control condition changing means stops the control processing to be executed by the inter-vehicle distance control means when a sudden change in deflection of central axis of the obstacle detecting apparatus is detected by the sudden-change detecting means.

The sudden-change detecting means detects a sudden change in deflection of central axis of the obstacle detecting apparatus. In general, such a sudden change occurs, for example, when a fixing member (or members) such as a screw comes off the obstacle detecting apparatus, or when something runs against the obstacle detecting apparatus or near elements to cause deformation to the obstacle detecting apparatus. In these cases, it is undesirable to continue the inter-vehicle distance control processing. To this end, the control condition changing means according to the seventeenth aspect of the present invention stops the control processing to be executed by the inter-vehicle distance control means when a sudden change in deflection is detected by the sudden-change detecting means. Therefore, the inter-vehicle distance control system according to the seventeenth aspect of the present invention can improve the safety more than the system according to the sixteenth aspect of the present invention.

BRIEF DESCRIPTION OF THE DRAWINGS

These objects and features of the present invention will become more readily apparent from the following detailed description of the preferred embodiments taken in conjunction with the accompanying drawings in which:

FIG. 11 is a flowchart showing an inter-vehicle distance control process executed by the control unit;

DETAILED DESCRIPTION OF THE INVENTION

Figure 1:
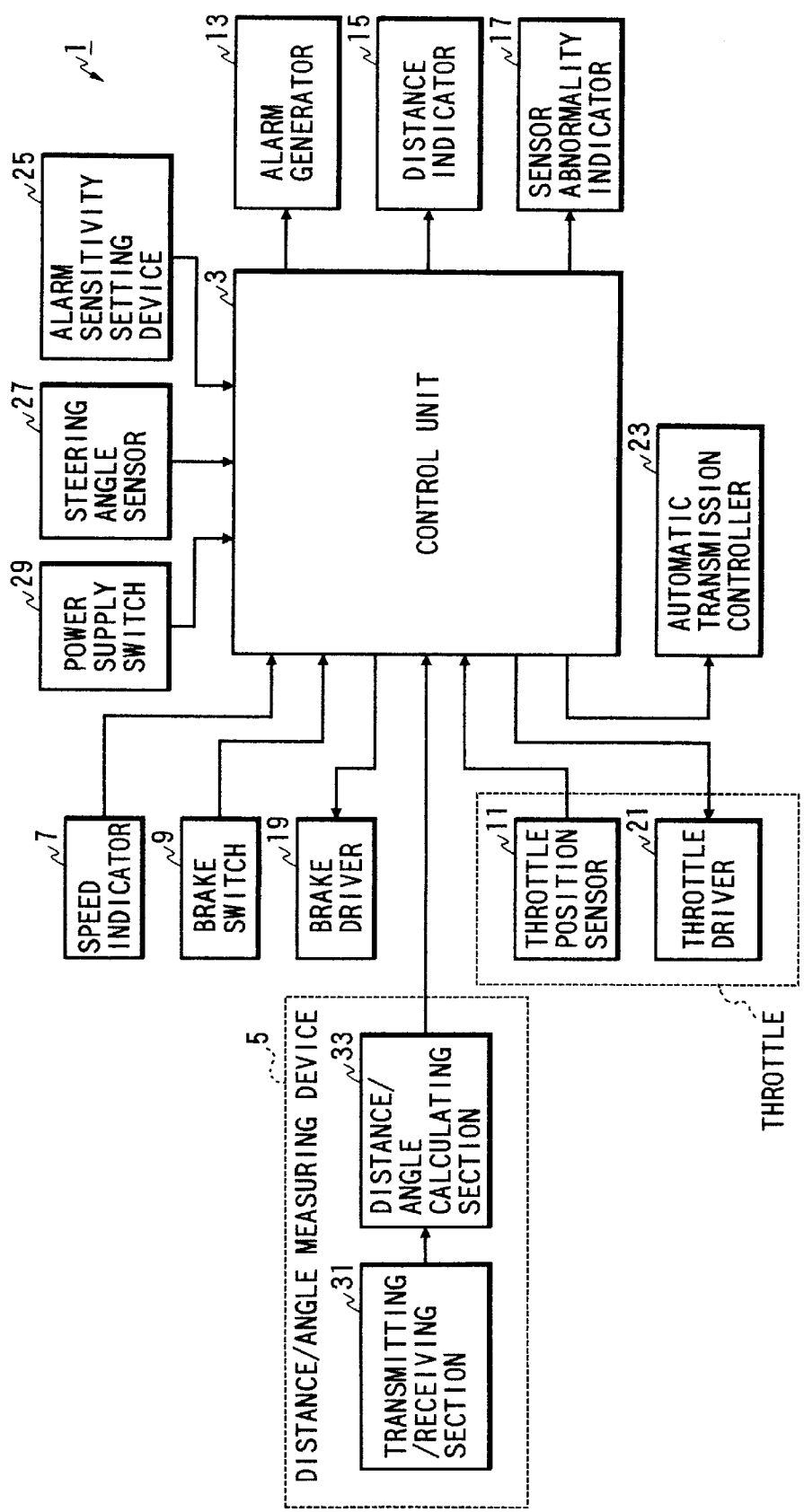
FIG. 1 is a block diagram showing a structure of a vehicle control system to which the present invention is applied.

Referring now to the drawings, a vehicle control system 1 according to the present invention will be described. The vehicle control system 1 is mounted on a vehicle and serves to issue an alarm or control the speed of the subject vehicle equipped with the system 1 relative to a vehicle ahead of the subject vehicle (preceding vehicle) when the preceding vehicle is present in a warning area and satisfies given conditions.

FIG. 1 is a block diagram showing a system structure. In FIG. 1, a control unit 3 is centered in the vehicle control system 1. The control unit 3 is mainly includes with a microcomputer including an input/output interface (I/O), and various driver circuits and detection circuits. Such a hardware structure is well known to those skilled persons and therefore the detailed description will be omitted.

The control unit 3 is electrically connected to a distance/angle measuring device 5, a vehicle speed sensor 7, a brake switch 9 and a throttle position sensor 11. The control unit 3 receives detected data from these devices 5, 7, 9 and 11 constituting an obstacle detecting apparatus for a vehicle.

The control unit 3 is electrically connected to an alarm sound generator 13, a distance indicator 15, a sensor abnormality indicator 17, a brake driver 19, a throttle driver 21, and an automatic transmission controller 23. The control unit 3 outputs drive signals to these devices 13, 15, 17, 19, 21, and 23, respectively.

The control unit 3 is electrically connected to an alarm sensitivity setting device 25 and a steering angle sensor 27. The alarm sensitivity setting device 25 serves to set the sensitivity used in a warning judgment process as described later. The steering angle sensor 27 serves to detect a steered angle of a steering wheel, not shown. The control unit 3 is electrically connected to a power supply switch 29. When the power supply switch 29 turns to the on-state, the control unit 3 starts its operation.

The distance/angle measuring device 5 includes a transmitting/receiving section 31 and a distance/angle calculating section 33. The transmitting/receiving section 31 emits a laser light beam forward of the subject vehicle. A given angular range ahead of the subject vehicle along a given optical axis (central axis) is scanned by the laser light beam. The transmitting/receiving section 31 then receives a reflect light beam from an object ahead of the subject vehicle. The distance/angle calculating section 33 detects the interval of time between the moment of transmission of the laser light beam and the moment of reception of the corresponding reflected light beam in response to an output signal of the transmitting/receiving section 31. The distance/angle calculating section 33 calculates the distance to the object ahead of the subject vehicle which caused the reflected light beam. Such a measuring device is well known to those skilled persons and therefore the detailed description will be omitted. The distance/angle measuring device 5 may use an electric wave or ultrasonic wave such as a microwave instead of laser light. Further, the distance/angle measuring device 5 may adopt a mono-pulsed system instead of the scan type system, in which the transmitting/receiving section 31 has two or more receivers and the distance/angle calculating section 33 calculates a distance to and an angle of the object ahead of the subject vehicle on the basis of differences in strength and phase (time) between received signals.

The control unit 3 executes warning judgment processing for issuing an alarm when an obstacle remains in the warning area for a predetermined time or longer. Examples of the obstacle are a moving vehicle which travels ahead of the subject vehicle, a stationary vehicle in front of the subject vehicle, and an object at a side of a road such as a guardrail and a pole. The control unit 3 also executes cruise control processing for controlling the speed of the subject vehicle according to the state of the vehicle ahead of the subject vehicle. The cruise control processing is executed by outputting a drive signal to the brake driver 19, the throttle driver 21, or the automatic transmission controller 23.

Figure 2:
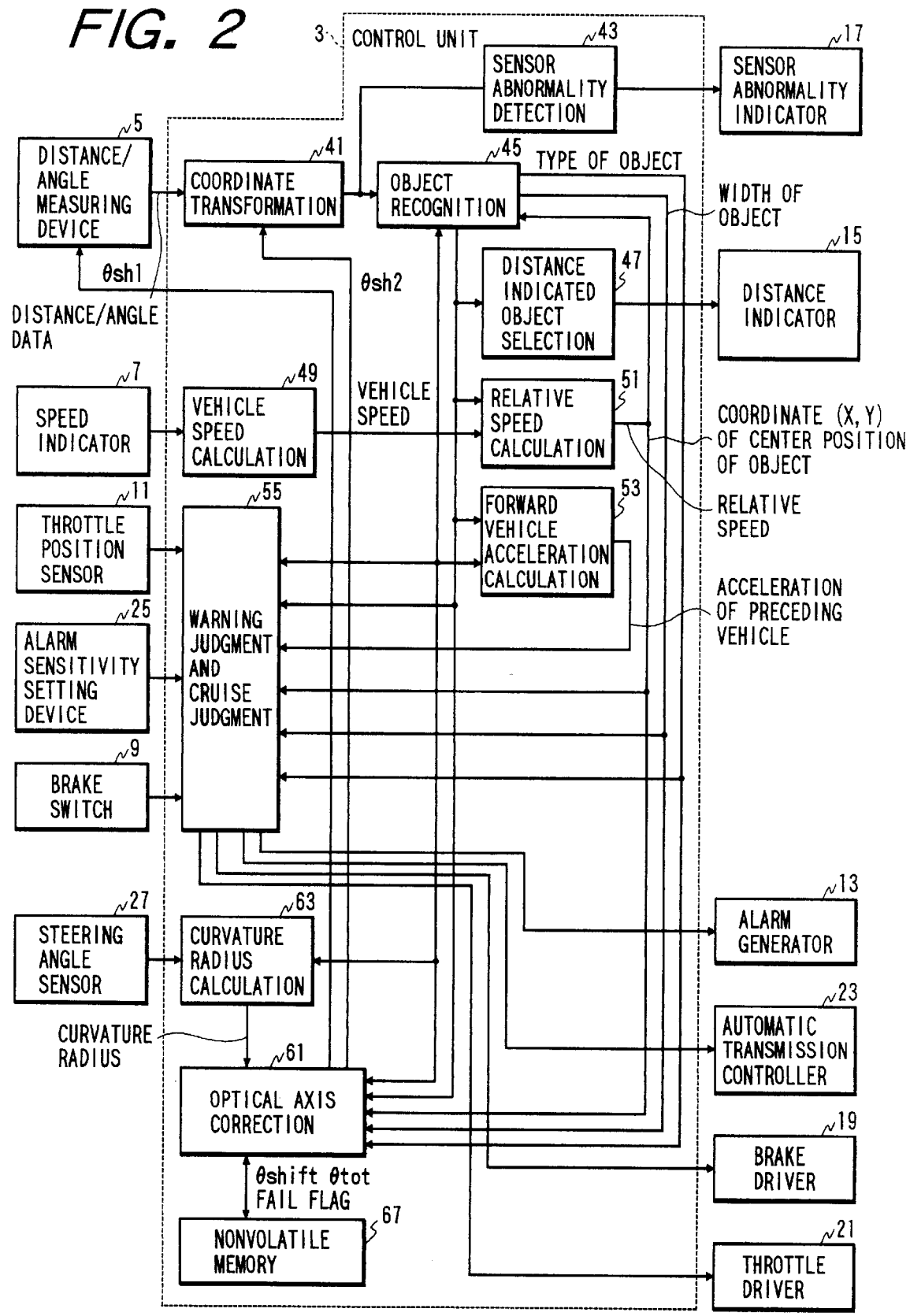
FIG. 2 is a block diagram showing a structure of a control unit of the vehicle control system.

FIG. 2 is a block diagram showing control blocks of the control unit 3. Data output from the distance/angle measuring device 5, which represent a calculated distance r and a calculated scan angle θ, are processed by a coordinate transformation block 41. Specifically, the distance r and the scan angle θ are transformed into values in XY orthogonal coordinates the origin (0, 0) of which agrees with a point of the subject vehicle. A sensor abnormality detection block 43 receives the values in the XY orthogonal coordinates from the coordinate transformation block 41, and determines whether or not the values in the XY orthogonal coordinates are in a given abnormal range. When the values in the XY orthogonal coordinates are in the given abnormal range, the sensor abnormality detection block 43 actuates the sensor abnormality indicator 17 to indicate that the distance r and the scan angle θ provided by the distance/angle measuring device 5 are inappropriate or incorrect.

An object recognition block 45 receives the values in the XY orthogonal coordinates from the coordinate transformation block 41, and recognizes and decides the type of the forward object, the width W, and the coordinates (X, Y) of the position of the center of the forward object in response to the values in the XY orthogonal coordinates. The type of the forward object is used to determine whether the forward object is a stationary object or a moving object. A distance indicated object selection block 47 following the object recognition block 45 determines whether or not the forward object has a given or higher chance of interference with the travel of the subject vehicle on the basis of the position of the center of the forward object. When the forward object has the given or higher chance of interference with the travel of the subject vehicle, the distance indicated object selection block 47 selects the forward object, and actuates the distance indicator 15 to indicate the distance to the selected forward object.

The output of the vehicle speed sensor 7 is processed by a vehicle speed calculation block 49. The vehicle speed calculation block 49 calculates the speed V of the subject vehicle from the output of the vehicle speed sensor 7. A relative speed calculation block 51 following both the object recognition block 45 and the vehicle speed calculation block 49 calculates the speed of the forward object (forward vehicle) relative to the subject vehicle and determines the coordinates (Vx, Vy) of the speed of the forward vehicle relative to the subject vehicle on the basis of the speed V of the subject vehicle and the position of the center of the forward object. A forward vehicle acceleration calculation block 53 then calculates the acceleration of the forward vehicle relative to the position of the subject vehicle on the basis of the speed of the subject vehicle and the position of the center of the forward object.

A warning judgment and cruise judgment block 55 receives the data pieces representing the speed of the subject vehicle, the speed of the forward vehicle relative to the subject vehicle, the acceleration of the forward vehicle relative to the position of the subject vehicle, the position of the center of the forward object, the width of the forward object, and the type of the forward object. The warning judgment and cruise judgment block 55 also receives the output of the brake switch 9, the data and output from the throttle position sensor 11 representing the position of the throttle, and the data output from the alarm sensitivity setting device 25 and representing the set value of the alarm sensitivity. In the warning judgment, the warning judgment and cruise judgment block 55 determines whether or not an alarm should be generated by referring to the received information. In the cruise judgment, the warning judgment and cruise judgment block 55 determines how to control the speed of the subject vehicle by referring to the received information. When an alarm is required, the warning judgment and cruise judgment block 55 outputs an alarm generation signal to the alarm sound generator 13. When the cruise control should be executed, the warning judgment and cruise judgment block 55 outputs control signals to the automatic transmission controller 23, the brake driver 19, and the throttle driver 21, respectively, to perform necessary control.

The control unit 3 further includes an optical axis correction block 61 for correcting the optical axis of the distance/angle measuring device 5. The optical axis correction block 61 receives the data pieces representing the speed of the subject vehicle, the speed of the forward vehicle relative to the subject vehicle, the position of the center of the forward object, the width of the forward object, and the type of the forward object. The optical axis correction block 61 also receives a data piece from a curvature radius calculation block 63. The curvature radius calculation block 63 serves to calculate the curvature radius R of a curve along which the subject vehicle travels on the basis of the speed of the subject vehicle and the output of the steering angle sensor 27. The optical axis correction block 61 calculates the deviation of the optical axis (the deflection of the central axis of the distance/angle measuring device 5) on the basis of the received data pieces and the curvature radius R fed from the curvature radius calculation block 63. Furthermore, the control unit 3 includes a nonvolatile memory 67. The nonvolatile memory 67 stores all the data to be used by the optical axis correction block 61 for calculating the deviation of the optical axis. The optical axis correction block 61 then outputs signals to the distance/angle measuring device 5 and the coordinate transformation block 41 so that the calculated deviation of the optical axis will be corrected. The signals output from the optical axis correction block 61 to the distance/angle measuring device 5 and the coordinate transformation block 41 will be described later.

A description will be made next to the optical axis correction process executed by the optical axis correction block 61 The optical axis correction process is a process for calculating the deviation of the optical axis on the basis of the data pieces and the curvature radius R, as cited above, and correcting the calculated deviation of the optical axis.

Figure 3:
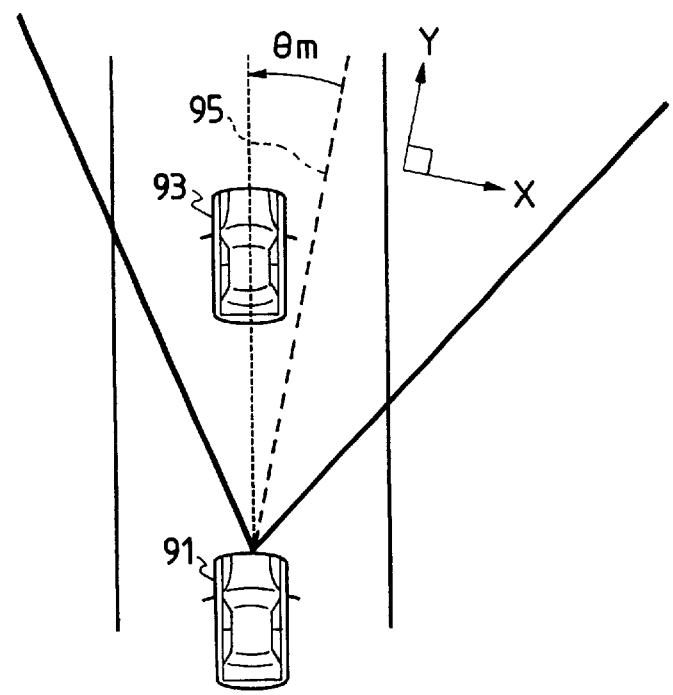
FIG. 3 is an illustration explaining how to calculate a deviation of an optical axis on the basis of the position of a preceding vehicle.
Figure 4:
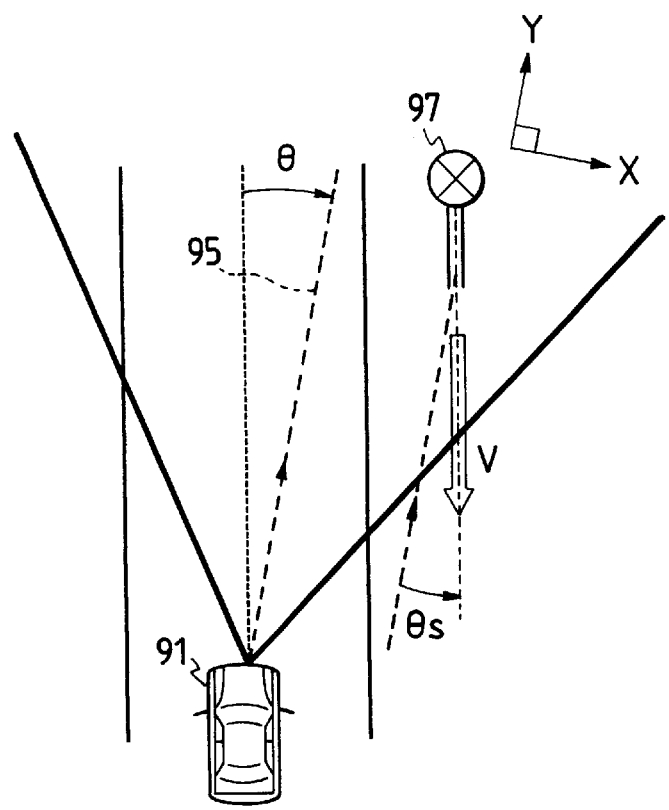
FIG. 4 is an illustration explaining how to calculate a deviation of an optical axis on the basis of a vector representing a speed of a road-side thing relative to a subject vehicle.

FIGS. 3 and 4 are illustrations explaining how to calculate the deviation of the optical axis. FIG. 3 shows a case where the deviation of the optical axis is calculated on the basis of the position of the forward vehicle, while FIG. 4 shows a case where the deviation of the optical axis is calculated on the basis of the vector representing the speed of the road-side object relative to the subject vehicle.

As shown in FIG. 3, when the subject vehicle 91 travels along the straight section of the road, in most cases, the obstacle recognized as a moving object is a vehicle (preceding vehicle) 93 ahead of the subject vehicle 91. Therefore, the preceding vehicle 93 is detected in a position straight ahead of the subject vehicle 91. If the optical axis 95 of the transmitting/receiving section 31 of the distance/angle measuring device 5 is oriented straight ahead of the subject vehicle 91, the preceding vehicle 93 will be detected on the optical axis 95. On the other hand, when the optical axis 95 deviates from the central axis of the vehicle, the preceding vehicle 93 is detected in a position deviated from the optical axis 95 by an angle θ m. In this case, the value θ of deflection of optical axis 95 is equal to −θ m.

As shown in FIG. 4, when the subject vehicle 91 travels along the straight section of the road, the vector V representing the relative speed of a road-side object 97 recognized as a stationary object is in parallel to the forward direction of the subject vehicle 91. Therefore, if the optical axis 95 of the transmitting/receiving section 31 of the distance/angle measuring device 5 is oriented straight ahead of the subject vehicle 91, the optical axis 95 and the vector V representing the relative speed of the road-side object 97 will be in parallel to each other. On the other hand, when the optical axis 95 deviates from the forward direction of the subject vehicle 91, the optical axis 95 and the vector V intersect with each other at an angle θ s. The angle θ s corresponds to the angle of the optical axis 95 deviated from the forward direction of the subject direction. In this case, the value θ of the deflection of optical axis 95 is equal to −θ s.

Figure 5:
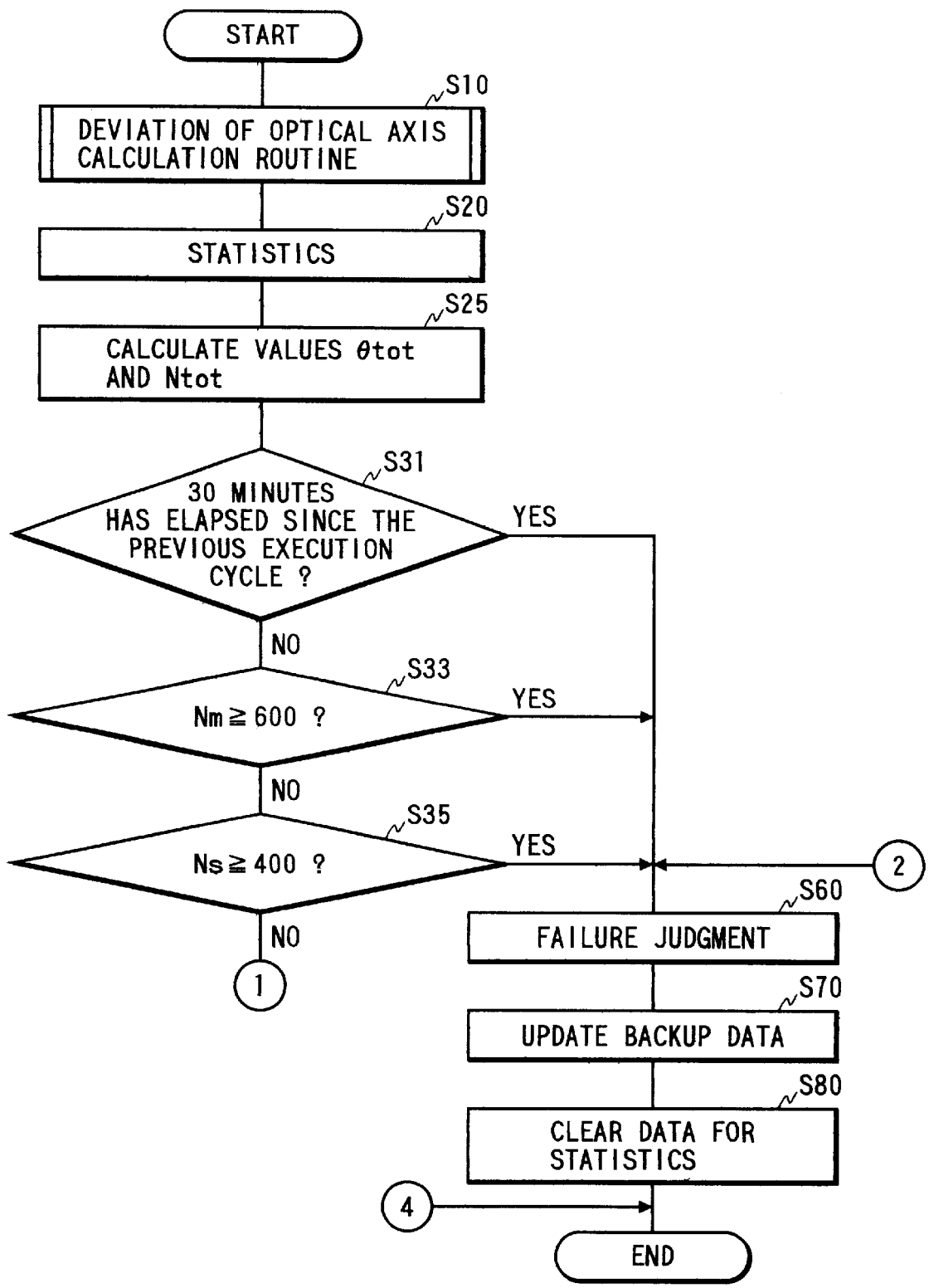
FIG. 5 is a flowchart showing a portion of an optical axis correction process executed by the control unit.
Figure 6:
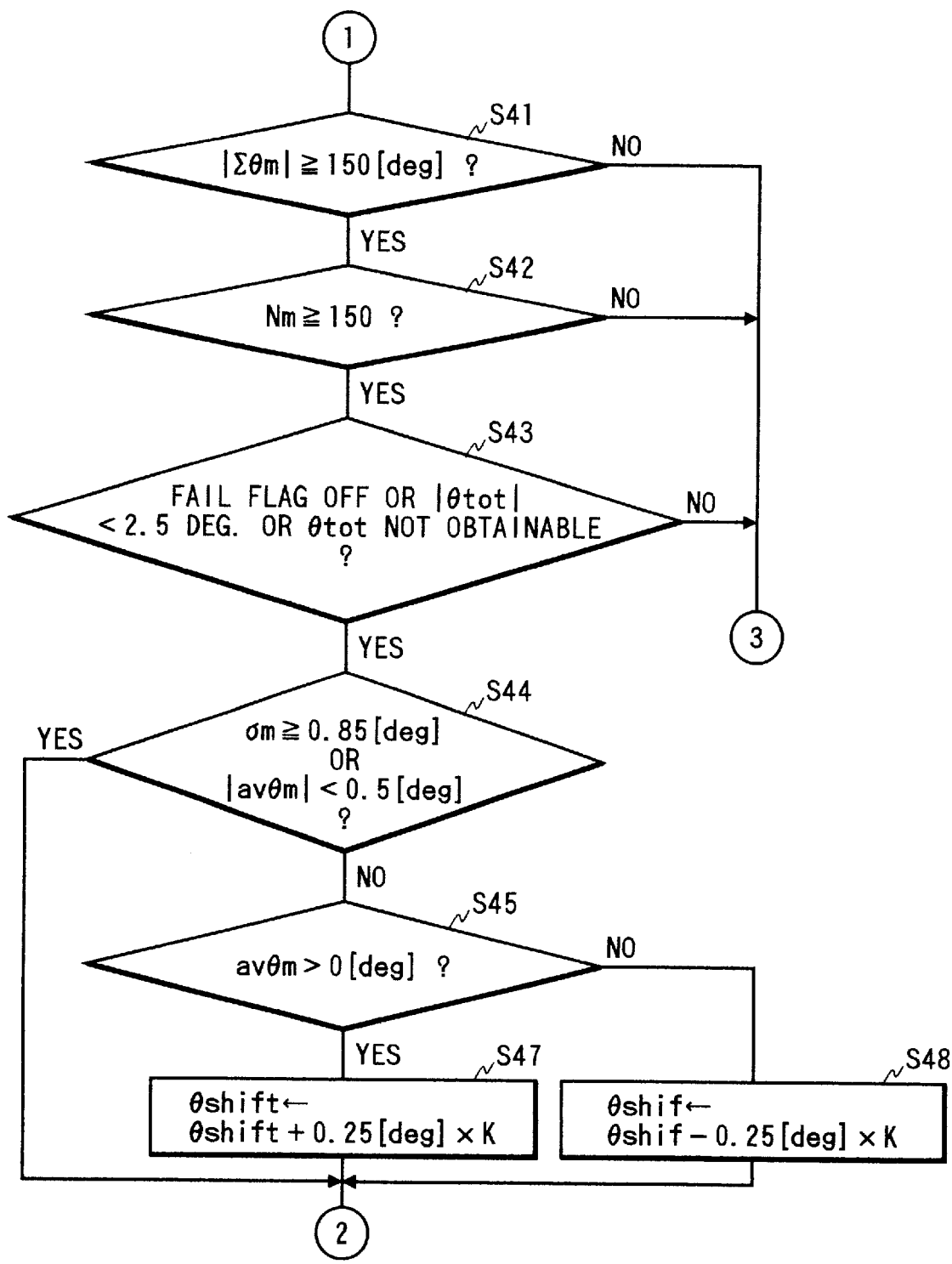
FIG. 6 is a flowchart showing a continued portion of the optical axis correction process executed by the control unit.
Figure 7:
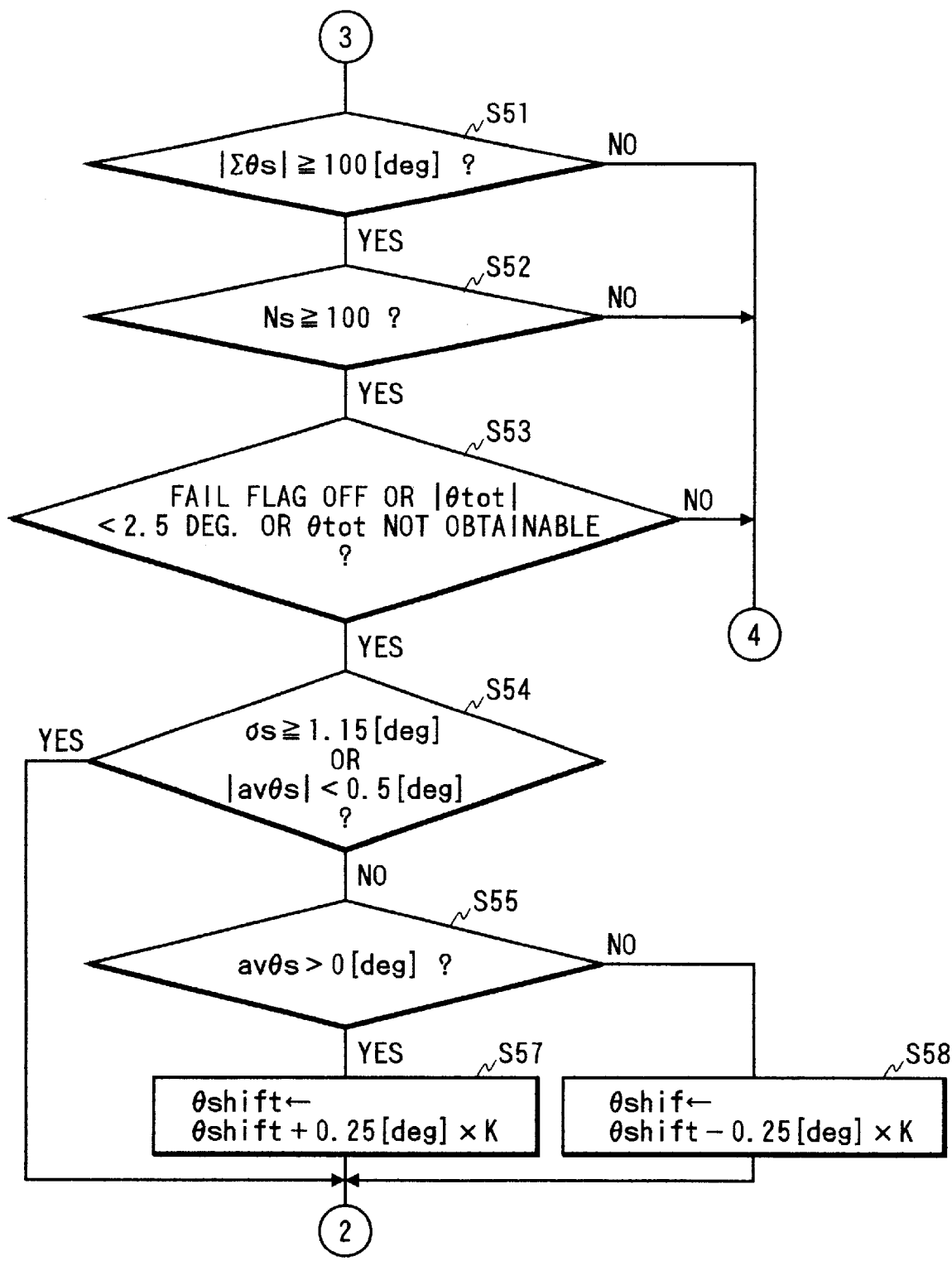
FIG. 7 is a flowchart showing a remaining portion of the optical axis correction process executed by the control unit.

FIGS. 5 to 7 are flowchart showing the optical axis correction process. The following description will be made on the assumption that the optical axis correction block 61 repeats the optical axis correction process every execution cycle of 200 ms after the power supply switch 29 turns to the on-state, the distance data output from the distance/angle measuring device 5 has a value ranging from 0 m to 150 m (resolution 0.1 m), and the angle data output from the distance/angle measuring device 5 has a value ranging from −8 deg to 8 deg (resolution 0.5 deg).

The optical axis correction process has a first step S10 (hereinbelow, the term "step" may be marked by "S"). S10 calculates the angles θ m and θ s. As previously described, the angle θ m represents the deviation of the optical axis (and −θ m represents an instantaneous value of the deviation of the optical axis), while the angle θ s represents the deviation of the optical axis (and −θ s represents an instantaneous value of the deviation of the optical axis). The angles θ m and θ s are not calculated for all the obstacles. The angles θ m and θ s are calculated by the following deviation of optical axis calculation routine on the basis of given conditions.

Figure 8:
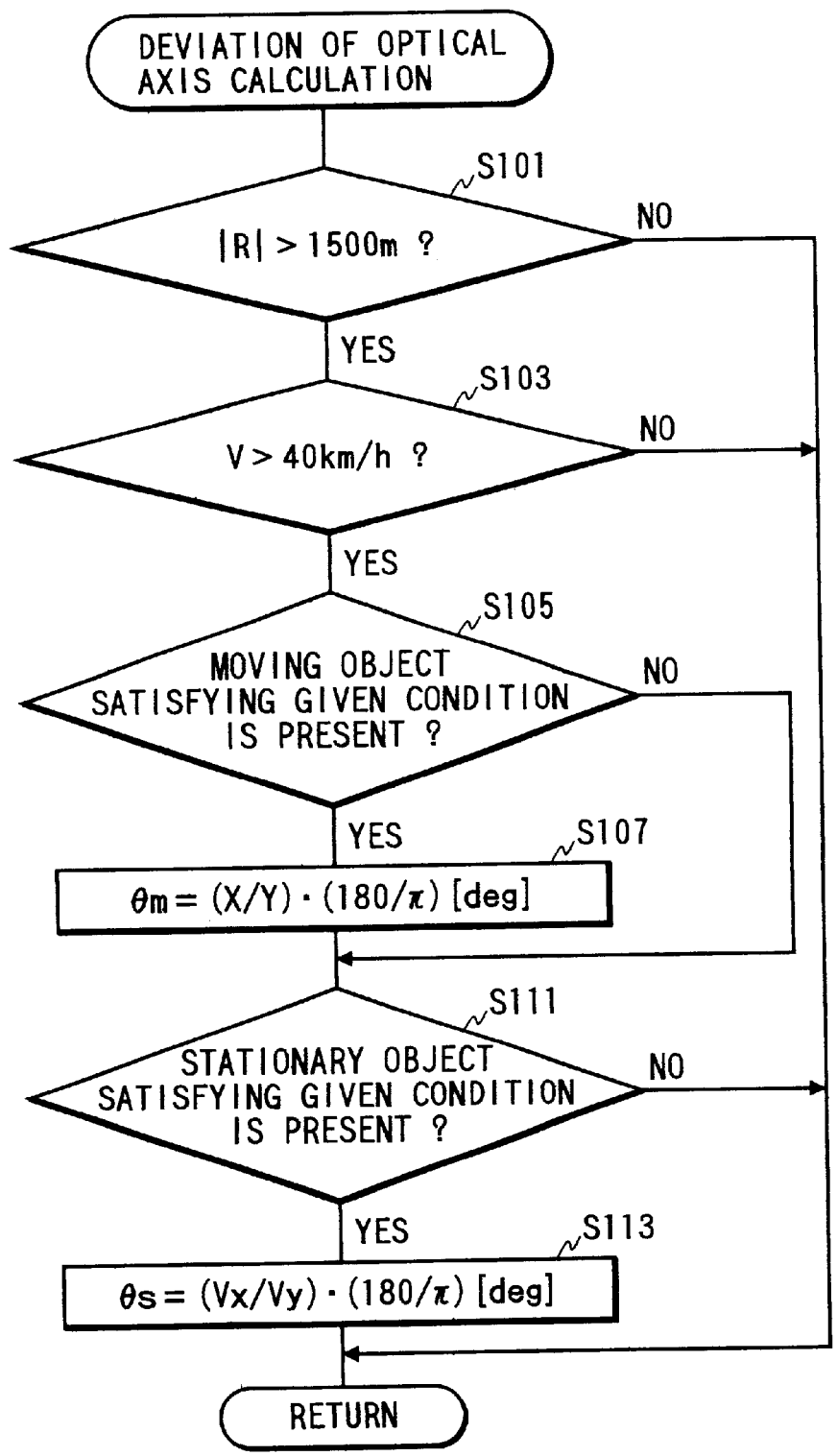
FIG. 8 is a flowchart showing a deviation of optical axis calculation routine in the optical axis correction process.

FIG. 8 is a flowchart showing the deviation of optical axis calculation routine. In the routine, it is determined whether or not the following conditions 1) and 2) are satisfied (S101, S103).

1) |curvature radius| > 1500 m          (S101)

2) Speed of subject vehicle $V > 40$ km/h          (S103)

In the case where either of the conditions 1) and 2) is not satisfied, i.e., in the case where a NO answer is obtained in S101 or S103, the routine ends without calculating both the angles θ m and θ s. After that, the program advances to S20 (FIG. 5) in which a statistical processing is executed. On the other hand, in the case where both of the conditions 1) and 2) are satisfied, i.e., in the case where YES answers are obtained in S101 and S103, the program advances from S103 to S105. In S105, it is determined whether or not there is at least one moving object such that all the following conditions are satisfied.

The moving object has been continuously detected for five seconds or more. If a plurality of moving objects continuously detected for five seconds or more are present, the moving object closest to the subject vehicle 91 is selected as a target object from among the plurality of moving objects.

The speed (Vx, Vy) of the moving object relative to the subject vehicle 91 have lately satisfied the following condition continuously for one second:

$$\begin{cases} |Vx| \leq 1.0 + \frac{Y[m]}{100} \text{ [km/h]} \\ |Vy| \leq 7.5 \text{ [km/h]} \end{cases}$$

The width of the moving object takes a value ranging from 1.2 m to 2.8 m.

In the case where there is at least one moving object such that all the above conditions are satisfied, i.e., an YES answer is obtained in S105, the program advances to S107. In S107, the angle θ m is calculated from the coordinates (X, Y) of the position of the center of the corresponding moving object by solving the following equation.

θm=(X/Y)·(180/π)          [deg]

After S107, the program advances to S111.

On the other hand, in the case where there is no moving object such that all the above condition are satisfied, i.e., a NO answer is obtained in S105, the program jumps to S111. In S111, it is determined whether or not there is at least one stationary object such that both of the following conditions are satisfied.

The stationary object has been continuously detected for one second or more.

The Y coordinate of the stationary object is equal to or less than 40 m.

In the case where there is at least one stationary object such that both the conditions are satisfied, i.e., in the case where an YES answer is obtained in S111, the program advances to S113. In S113, the angle θ s is calculated from the speed (Vx, Vy) of the corresponding stationary object relative to the subject vehicle 91 by solving the following equation.

$$\theta s = (Vx/Vy) \cdot (180/\pi) \quad [\text{deg}]$$

After S113, this routine ends and the program returns to S20.

On the other hand, in the case where there is no stationary object such that both the conditions are satisfied, i.e., in the case where a NO answer in obtained in S111, this routine ends and the program returns to S20.

Returning to FIG. 5, S20 executes the statistical processing with respect to the calculated angles θ m and θ s in the following manner.

$$Nm - Nm + 1$$

$$\sum^{Nm} \theta m - \sum^{Nm-1} \theta m + \theta m$$

$$\sum^{Nm} \theta m^2 - \sum^{Nm-1} \theta m^2 + \theta m^2$$

$$av\theta m = \sum \theta m / Nm$$

$$\sigma m^2 = \left\{\sum \theta m^2 - \left(\sum \theta m\right)^2 / Nm\right\} / Nm$$

In this processing, "1" is added to the number of data Nm representing the angle θ m, the current angle θ m and a square of the current angle θ m2 are added to values θ m and θ m2 representing the total sum of the previous angles θ m and squares of the previous angles θ m2, a mean or average value av θ m (hereinbelow, the mark "av" denotes mean or average) and a square of a standard deviation σ m2 of the angles θ m are calculated on the basis of the updated Nm, Σθ m, and Σθ m².

Similarly, for the angle θ s, $$Ns - Ns + 1$$

$$\sum^{Nm} \theta s - \sum^{Nm-1} \theta s + \theta s$$

$$\sum^{Nm} \theta s^2 - \sum^{Nm-1} \theta s^2 + \theta s^2$$

$$av\theta s = \sum \theta s / Ns$$

$$\sigma s^2 = \left\{\sum \theta s^2 - \left(\sum \theta s\right)^2 / Ns\right\} / Ns$$

In this processing, the calculation is made with respect to the following values: Ns, Σθ s, Σθ s², av θ s, and σ s².

After S20, the program advances to S25. In S25, all the angles θ m and θ s are united on the basis of the total amount of statistics of the angles θ m and θ s calculated by S20. In other words, S25 calculates a representative value θ tot of the angles θ m and θ s separately calculated by S20 and the number of corresponding data Ntot. The calculation is made by determining whether or not the following conditions are satisfied.

Condition A : $|-\text{av } \theta \text{ s} - \theta \text{ shift}| \geq 6.0$ deg and Ns≧20

Condition B : σs<1.5 deg

Condition C : Nm≧30 and σ m<0.85 deg

Condition D : Ns≧20 and σ s<1.15 deg

In the condition A, "θ shift" denotes a value representing the correction value of the optical axis 95 (i.e., the deviated amount of the optical axis 95), which is stored in the nonvolatile memory 67 in a manner described later. The value θ shift has a value ranging from 5 to 2.5 deg inclusive. As previously noted, the transmitting/receiving section 31 of the distance/angle measuring device 5 emits a laser light beam over an angular range of ±8.0 deg from the optical axis 95 to both sides of the width direction of the subject vehicle 91. In this case, the condition A indicates that the deviation of the optical axis 95 is too large to fully detect the forward object. The condition B indicates that the calculated average value av θ s can be used as a true value of the angle θ s reliably to some degree. The conditions C and D indicate that the calculated average values av θ m and av θ s can be reliably used as true values of the angles θ m and θ s, respectively.

In the case where the condition A is not satisfied and the conditions C and D are satisfied, the average values av θ m and av θ s are reliable. Therefore, the representative value θ tot and the number of data Ntot are calculated by solving the following equations.

$$\theta tot = \frac{-av\theta m \cdot Nm - av\theta s \cdot Ns}{Nm + Ns} - \theta shift$$

$$\theta tot = Nm + Ns$$

In the case where the conditions A and D are not satisfied and the condition C is satisfied, the values θ tot and Ntot are calculated by solving the following equations.

θtot=−avθm−θshift

Ntot=Nm

In the case where the conditions A and B are satisfied, or in the case where the conditions A and C are not satisfied and the condition D is satisfied, the values θ tot and Ntot are calculated by solving the following equations. In other words, when the forward object cannot be detected adequately (condition A), if the forward object is assumed to be the preceding vehicle 93, the value θ m has a high chance to include an error. In this case, if the average value av θ s is reliable to some degree, the values θ tot and Ntot are calculated from the average angle av θ s. Similarly, even when the forward object can be detected, if only the average value av θ s is reliable to some degree, the values θ tot and Ntot are calculated from the average value av θ s.

θtot=−avθs−θshift

Ntot=Ns

In the case where the condition A is satisfied and the condition B is not satisfied, or in the case where the conditions A, C and D are not satisfied, the calculation of the representative value θ tot is not obtainable and the number of data Ntot is set equal to 0. In other words, when the forward object cannot be detected adequately, if the average value av θ s is not reliable, the calculation of the representative value θ tot is not obtainable. Similarly, even when the forward object can be detected, if both the average values av θ s and av θ m are not reliable, the calculation of the representative value θ tot is not obtainable.

S31 to S35 following S25 determine whether or not at least one condition is satisfied among the following conditions (a) to (c).

(a) 30 minutes has elapsed since the power switch 29 turned to be on-state, or since the program advanced to S60 in the last execution cycle (S31).

(b) Nm≧600 (S33)

(c) Ns≧400 (S35)

In the case where at least one condition is satisfied, i.e., in the case where an YES answer is obtained in any one of steps S31, S33 and S35, the program advances to S60. On the other hand, in the case where no conditions are satisfied, i.e., in the case where NO answers are obtained in all the steps S31, S33 and S35, the program advances to S41.

S41 to S43 determine whether or not all the following conditions (a) to (c) are satisfied, i.e., these steps determine whether or not the optical axis 95 can be corrected by the correction value θ shift calculated from the values θ m.

(a) $|\sum \theta m| \geq 150\ deg$ (S41)

(b) $Nm \geq 150$ (S42)

(c) One of the following conditions is satisfied. (S43)

A fail flag is off-state (the fail flag will be described later in S60).

↑|θtot|<2.5 deg

The representative value θ tot is not obtainable.

In the case where all the conditions (a) to (c) are satisfied, i.e., in the case where YES answers are obtained in all the steps S41, S42 and S43, the program advances to S44.

The values σ m and |av θ m| are compared with 0.85 deg and 0.5 deg, respectively, in S44, and the value av θ m is compared with 0 deg in S45. On the basis of the comparisons, the value θ shift is corrected as follows.

(1) When the value σ m is equal to or larger than 0.85 deg or the absolute value of the average value av θ m, (i.e., |av θ m|) is smaller than 0.5 deg, i.e., when an YES answer is obtained in S44, the program advances to S60 with maintaining the current value θ shift.

(2) When the value a m is smaller than 0.85 deg and the average value av θ m is equal to or larger than 0.5 deg, i.e., when a NO answer is obtained in S44 and an YES answer is obtained in S45 the program advances to S47 In S47 the value θ shift is corrected by solving the following equation:

$$\theta shift = \theta shift + 0.25\ [\deg] \times K$$

$$K = \begin{cases} 1 & (0.5 \leq av\theta m < 1.0\ [\deg]) \\ \text{INT}[(av\theta m - 0.5)/0.25] & (av\theta m \geq 1.0\ [\deg]) \end{cases}$$

where the upper limit of the value θ shift is set to 2.5 deg. In addition, "INT" means an operator denoting the integer part of the numerical value in the subsequent parentheses. After the corrected value θ shift is obtained in S47 the program advances to S60.

(3) When the value σ m is smaller than 0.85 deg and the average value av θ m is equal to or smaller than −0.5 deg, i.e., when NO answers are obtained in S44 and S45, the program advances to S48. In S48, the value θ shift is corrected by solving the following equation:

$$\theta shift = \theta shift - 0.25\ [\deg] \times K$$

$$K = \begin{cases} 1 & (-1.0 < av\theta m \leq -0.5\ [\deg]) \\ \text{INT}[(-av\theta m - 0.5)/0.25] & (av\theta m \leq -1.0\ [\deg]) \end{cases}$$

where the lower limit of the value θ shift is set to −2.5 deg.

On the other hand, when a NO answer is obtained in any one of steps S41 to S43, it is determined that the optical axis 95 cannot be corrected by the correction value θ shift calculated from the angle θ m. In this case, the program advances to S51.

Steps S51 to S53 determine whether or not all the following conditions (a) to (c) are satisfied, i.e., these steps determine whether or not the optical axis 95 can be corrected by the correction value θ shift calculated from the values θ s.

(a) $|\theta s| \geq 100\ deg$ (S51)

(b) $Ns \geq 100$ (S52)

(c) One of the following conditions is satisfied. (S53)

A fail flag is in off-state.

|θtot|<2.5 deg

The representative value θ tot is not obtainable.

In the case where all the conditions (a) to (c) are satisfied, i.e., in the case where YES answers are obtained in all the steps S51, S52 and S53, the program advances to S54. Otherwise, the current execution cycle ends.

The values σ s and |av θ s| are compared with 1.15 deg and 0.5 deg, respectively, in S54, and the value av θ s is compared with 0 deg in S45. On the basis of the comparisons, the value θ shift is corrected as follows.

(1) When the value σ s is equal to or larger than 1.15 deg or the absolute value of the average value av θ s (i.e., |av θ s|) is smaller than 0.5 deg, i.e., when an YES answer is obtained in S54, the program advances to S60 with maintaining the current value θ shift.

(2) When the value σ s is smaller than 1.15 deg and the average value av θ m is equal to or larger than 0.5 deg, i.e., when a NO answer is obtained in S54 and an YES answer is obtained in S55, the program advances to S57. In S57, the value θ shift is corrected by solving the following equation:

$$\theta shift = \theta shift + 0.25\ [\deg] \times K$$

$$K = \begin{cases} 1 & (0.5 \leq av\theta s < 1.0\ [\deg]) \\ \text{INT}[(av\theta s - 0.5)/0.25] & (av\theta s \geq 1.0\ [\deg]) \end{cases}$$

where the upper limit of the value θ shift is set to 2.5 deg. After the corrected value θ shift is obtained in S57, the program advances to S60.

(3) When the value a s is smaller than 1.15 deg and the average value av θ s is equal to or smaller than −0.5 deg, i.e., when NO answers are obtained in S54 and S55, the program advances to S58. In S58, the value θ shift is corrected by solving the following equation:

$$\theta shift - \theta shift - 0.25 \text{ [deg]} \times K$$

$$K = \begin{cases} 1 & (-1.0 < av\theta s \leq -0.5 \text{ [deg]}) \\ \text{INT}[(-av\theta s - 0.5)/0.25] & (av\theta s \leq -1.0 \text{ [deg]}) \end{cases}$$

where the lower limit of the value θ shift is set to −2.5 deg

In the optical axis correction process, the sequence of steps S10, S20, S25, S31–S35, S41 S43, and S51–S53 are repeated in normal execution cycles. Once the optical axis correction is required, i.e., when an YES answer is obtained in any one of steps S31–S33, S41 S43, and S51–S53, the optical axis correction process is executed in S47 S48 S57 or S58 as required. After the optical axis correction process, the program advances to S60. In S60, the fail flag is set to be on-state or off-state in the following manner. Here, the fail flag, which is initially set to an off-state, indicates that the deviation of the optical axis 95 is too large to detect the forward object. If the fail flag turns to the on-state, the control unit 3 actuates the sensor abnormality indicator 17 to perform warning indication through a known routine, not shown.

In S60, when the value | θ shift | is equal to or larger than 2.25 deg or the value | θ tot | is equal to or larger than 4.0 deg, the fail flag is set to be on-state in S60. On the other hand, when the value |θ shift | is equal to or smaller than 1.5 deg or the value |θ tot | is equal to or smaller than 1.5 deg, the fail flag is set to be off-state in S60. Otherwise, the fail flag remains in its current state.

S70 following S60 supplies the values θ shift, θ tot and the set value of the fail flag to the nonvolatile memory 67 for updating these data. After S70, the program advances to S80. In S80, all the six statistical data Nm, Σ θ m, Σ θ m², Ns, Σ θ s, and Σ θ s² are cleared, and the program ends. It should be noted that when the value Ntot calculated during the current execution cycle is smaller than 100, S70 does not write the calculated value Ntot into the nonvolatile memory 67, and the previous value Ntot currently stored remains in the nonvolatile memory 67. In addition, the nonvolatile memory 69 assigns a one-byte storage area to the value θ shift, a one-byte storage area to the value θ tot, and a one-bit storage area to the fail flag, respectively. Further, the data representing the value θ shift sequentially shifts its address every given interval, for example, 30 minutes so that previously-stored θ shift data will remain in the nonvolatile memory 67.

After the correction value of the optical axis 95 represented by the value θ shift is calculated, the optical axis correction block 61 outputs a signal corresponding to the value θ shift to the distance/angle measuring device 5 and the coordinate transformation block 41, so that the data input to the object recognition block 45 are corrected. In other words, the optical axis correction block 61 decomposes or resolves the value θ shift calculated during the current execution cycle into a value θ sh1 corresponding to an integral multiple of 0.5 deg and a value θ sh2 corresponding to a remainder from the value θ sh1, and supplies the distance/angle measuring device 5 and the coordinate transformation block 41 with the values θ sh1 and θ sh2, respectively. These resolved values θ sh1 and θ sh2 exhibit the following relation:

θshift=θsh1+θsh2(θsh1=0.5[deg]×n), where "n" is an integer denoting the maximum absolute value of the values that satisfy the relation|θshift|≧0.5deg×|n|, and θsh2=θshift−θsh1.

Figure 9:
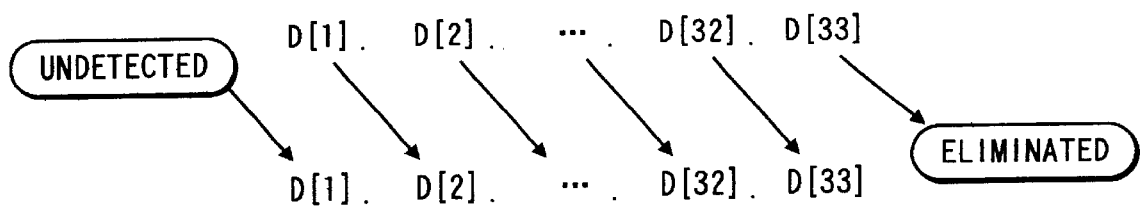
FIG. 9 is a diagram explaining the optical axis correction process executed by a distance/angle measuring device.

In the distance/angle measuring device 5, the transmitting/receiving section 31 scans an angular range of ±0.8 deg from the optical axis 95 to both sides of the width direction of the subject vehicle 91 with a resolution of 0.5 deg for detecting the object 93 or 97, while the distance/angle calculating section 33 stores 33 data pieces, each representing a distance to the object 93 or 97 detected by each pulse of the laser light beam, at each address (D[1] to D[33]) in an internal memory. For this reason, the data pieces stored at the respective addresses D[1] to D[33 ] can be shifted sequentially by n data pieces to correct the deviation of the optical axis 95. For example, when "n" is set equal to 1, the data pieces are shifted as shown in FIG. 9. The distance/angle calculating section 33 of the distance/angle measuring device 5 thus corrects the deviation of the optical axis 95 on the basis of the value θ sh1. In the example of FIG. 9, the address D[1] to which an undetected data is shifted is supplied with a data piece indicating that no reflected light beam has been detected.

Even after correcting the optical axis 95 on the basis of the value θ sh1, the optical axis 95 has yet deviated from the centerline of the subject vehicle 91 by an angle smaller than 0.5 deg. It is therefore necessary to further correct the optical axis 95 by an angle θ sh2. The coordinate transformation block 41 thus corrects the deviation of θ sh2 during the coordinate transformation processing. For example, when the coordinate transformation block 41 executes the coordinate transformation processing according to the following relation:

$Y=r$, and $X=r\cdot\theta$, where θ[rad],≈0 and "r"

denotes a distance to the object, the optical axis 95 is corrected by solving the following equation.

$X=r\cdot(\theta-\theta sh2\cdot\pi/180)$

Such corrections of the optical axis 95 allow the object recognition block 45 to accurately decide data pieces such as coordinate (X, Y) of the position of the center of the object, and hence the warning judgment and cruise judgment block 55 to accurately execute the warning determination and the cruise determination. On the other hand, in the case where the value θ shift is too large to detect the object, the fail flag is set to be on-state, so that the control unit 3 actuates the sensor abnormality indicator 17 to perform warning indication. In this case, the mounting angle of the transmitting/receiving section 31 of the distance/angle measuring device 5 needs to be corrected by a car mechanic (at an auto repair shop) on the basis of the value θ tot stored in the nonvolatile memory 67.

As previously described, the optical axis correction block 61 executes two optical axis correction processings concurrently, one uses the value θ m calculated with respect to a moving object such as the preceding vehicle 93 and the other uses the value θ s calculated with respect to a stationary object such as the road-side object 97. Therefore, the value θ shift is calculated on the basis of the value θ s when there is no moving object such as preceding vehicle 93 in the forward direction of the subject vehicle 91, while it is calculated on the basis of the value θ m when a plurality of vehicles travels ahead of the subject vehicle and no stationary object such as road-side object 97 can be detected because such a stationary object is hidden by the vehicles ahead of the subject vehicle 91. Since the value θ shift can be calculated irrespective of the road conditions, the deviation of the optical axis 95 can be automatically corrected in most cases.

The calculations of the values θ m and θ s are made with respect to the respective objects which have been continuously detected during a given time interval or more, for example, five seconds for the value θ m and one second for the value θ s. Therefore, the value θ shift can be calculated by eliminating the other data representing objects temporarily detected such as an erroneously-recognized object or a vehicle traveling along a lane adjacent to the subject vehicle's lane, and this makes it possible to accurately correct the deviation of the optical axis 95. Particularly, the value θ m is calculated from the data representing the preceding vehicle 93 that has been continuously detected for a longer time, so that the correction of the optical axis 95 is improved more than the case the value θ s is used for the correction.

Further, the calculation of the value θ m is made with respect to a moving object having a speed (Vx, Vy) relative to the subject vehicle the absolute value of which is small enough, so that data representing a moving object such as a vehicle traveling along the adjacent lane or a vehicle detected during cornering can be eliminated. Furthermore, the calculation of the value θ m is made with respect to only a moving object the width W of which exhibits the relation that 1.2 m<W<2.8 m, so that data representing a moving object such as a two-wheeled vehicle or a vehicle the one-side reflector of which cannot be detected, or data representing vehicles that are recognized as an object thought they are traveling side by side with each other. In most cases, these data are unsuitable for correcting the optical axis 95 because of a high probability that the center coordinates (X, Y) thereof do not correspond to the center line of the subject vehicle's lane. Therefore, the deviation of the optical axis 95 can be corrected more accurately.

Figure 10A:
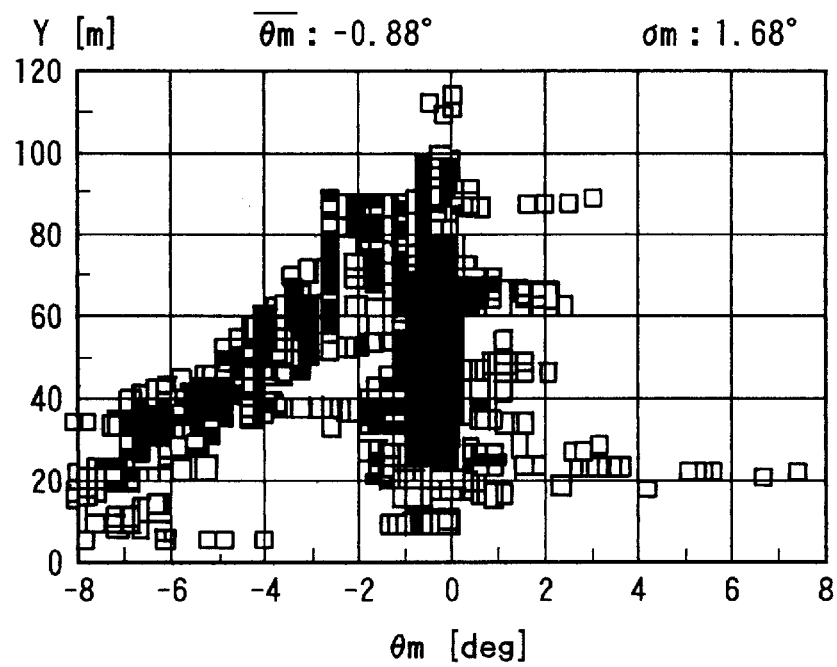
FIGS. 10A and 10B are graphs explaining the effect when only a moving object is used as a target obstacle in the optical axis correction process.
Figure 10B:
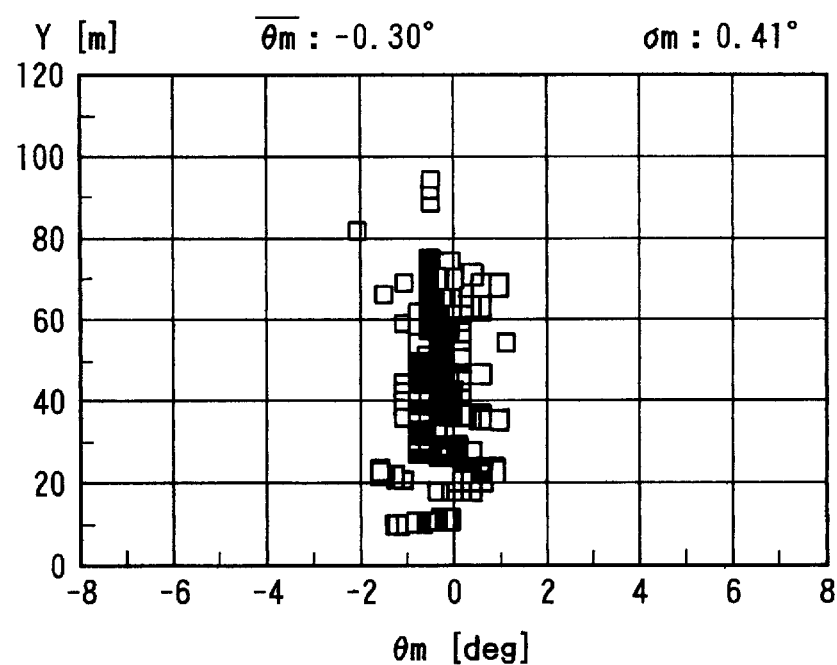

FIG. 10A shows center coordinates (X, Y) of objects each of which has been recognized as a moving object for five seconds or more on the assumption that the optical axis 95 is correctly oriented straight ahead of the subject vehicle 91. On the other hand, FIG. 10B shows center coordinates (X, Y) of objects that are selected from among the objects exemplified by FIG. 10A. The objects the center coordinates (X, Y) of which are shown in FIG. 10B further satisfy the conditions related to the relative speed (Vx, Vy) and the width W. As apparent from FIGS. 10A and 10B, a target vehicle (e.g., the preceding vehicle 93) traveling straight ahead of the subject vehicle 91 can be properly extracted from the data representing moving objects by adding such limited conditions to the selection of the target object. Thus, the deviation of the optical axis 95 can be corrected with a very high accuracy. In addition, FIGS. 10A and 10B assume each angle θ at the right side of the subject vehicle 91 to be positive.

In correcting the deviation of the optical axis 95 on the basis of the value θ s, since the value θ s is calculated with respect to a stationary object that satisfies the condition that Y≦40 m, a calculation error resulting from the road condition such as a curve can be effectively avoided, so that the accuracy in correction can be further improved. Further, the values θ m and θ s are calculated plural times to derive respective average values av θ m and av θ s. The reliability of the average values θ m and θ s is evaluated from the standard deviation δ m and δ s to compare the evaluated values av θ m and av θ s with each other. As a result, the value θ shift is corrected from one of the average values θ m and θ s the relatively of which is higher than the other. However, if both the average values θ m and θ s are not reliable, i.e., when the value θ tot is not obtainable, both the average values θ m and θ s are disabled for correcting the deviation of the optical axis 95. Accordingly, further accurate correction of the optical axis 95 can be carried out.

In the case where the deviation of the optical axis 95 is too large to detect the target object, the value θ tot is calculated by using only the values θ s. As previously described, although such a large deviation of the optical axis 95 makes it difficult to detect the preceding vehicle 93, the data representing the road-side object 97 can be used to calculate the value θ tot with a relatively high accuracy, so that the correction of the optical axis 95 is made possible even when the deviation of the optical axis 95 is relatively large.

In the above embodiment, the value θ shift further decomposed or resolved into θ sh1 and θ sh2 to correct the optical axis 95. In the example of FIG. 9, the deviation of the optical axis 95 is actually corrected as follows. The data stored at the addresses D[1] to D[33] are shifted sequentially in response to the value θ sh1, while the coordinate transformation block 41 alters the equation for the coordinate transformation in response to the value θ sh2. The former processing is very easy to perform while the latter processing enables a highly accurate correction. Therefore, the accuracy of the warning determination or the cruise control can be also improved excellently.

Referring next to FIGS. 11 to 14, a description will be made to an inter-vehicle distance control process which is executed on the basis of the amount of deviation of the optical axis 95 calculated as discussed above. The inter-vehicle distance control process is used as one solution for the cruise control, so that the subject vehicle 91 can travel with maintaining a given distance to a preceding vehicle 93. FIG. 11 shows a main flow of the inter-vehicle distance control process.

The warning judgment and cruise judgment block 55 periodically executes the inter-vehicle distance control process. The inter-vehicle distance control process has a first step S91. The first step S91 executes a controllability judgment routine for determining whether or not the control is possible. The controllability judgment routine is shown in detail in FIG. 12.

Figure 12:
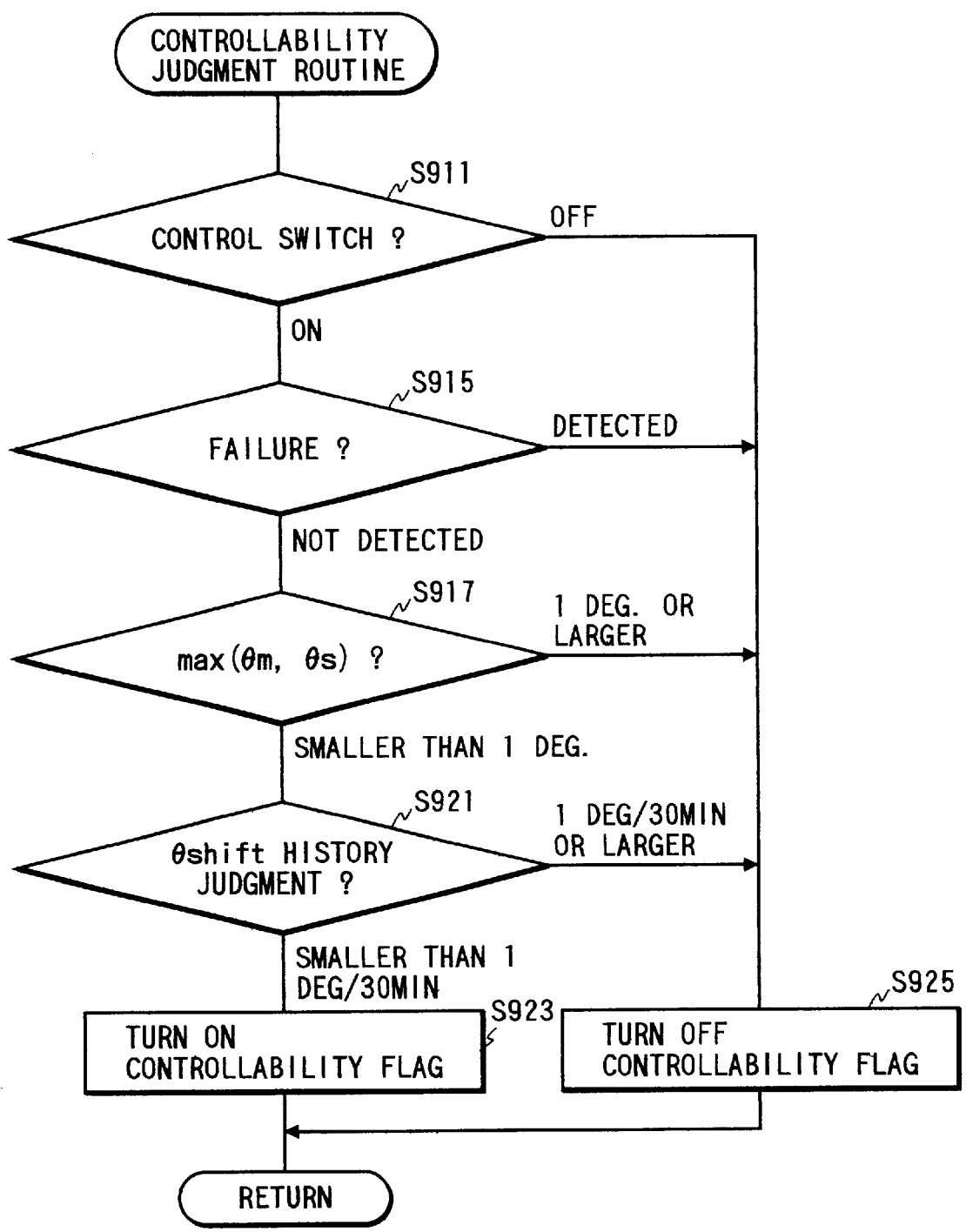
FIG. 12 is a flowchart showing a controllability judgment routine in the inter-vehicle distance control process.

In FIG. 12, S911 to S921 determine whether or not conditions for executing inter-vehicle control are satisfied. Specifically, S911 determines whether a control switch is set to the on-state for executing the control or to the off-state for inhibiting the control. S915 determines whether or not a failure (abnormality) of an actuator such as the brake driver 19 or the throttle driver 21 is detected. S917 determines whether the larger one between the values θ m and θ s calculated during the latest execution cycle of S10 (and after correcting the optical axis by an angle of the value θ shift) is smaller than 1 deg or not. S921 determines whether or not the shifted rate of the value θ shift in the latest 30-minute interval is smaller than 1 deg or not.

In the case where all the above conditions are satisfied, i.e., in the case where YES answers are obtained in all the steps S911, S915, S917 and S921, the program advances to S923. S923 turns on a controllability flag. After S923, the program returns to the main flow of FIG. 11. On the other hand, in the case where any one of the above conditions is not satisfied, i.e., in the case where a NO answer is obtained in any one of the steps S911, S915, S917 and S921, the program jumps to S925. S925 turns off the controllability flag. After S925, the program returns to the main flow of FIG. 11.

Returning to FIG. 11, the program advances from S91 to S93. S93 determine whether or not the controllability flag is in the on-state or off-state. If the controllability flag is in the on-state, the program advances to S95. S95 executes an inter-vehicle control routine as described later. After S95, the inter-vehicle control process ends. On the other hand, if the controllability flag is in the off-state, the program advances to S97. S97 disables or stops the inter-vehicle control process and this program portion ends.

Figure 13:
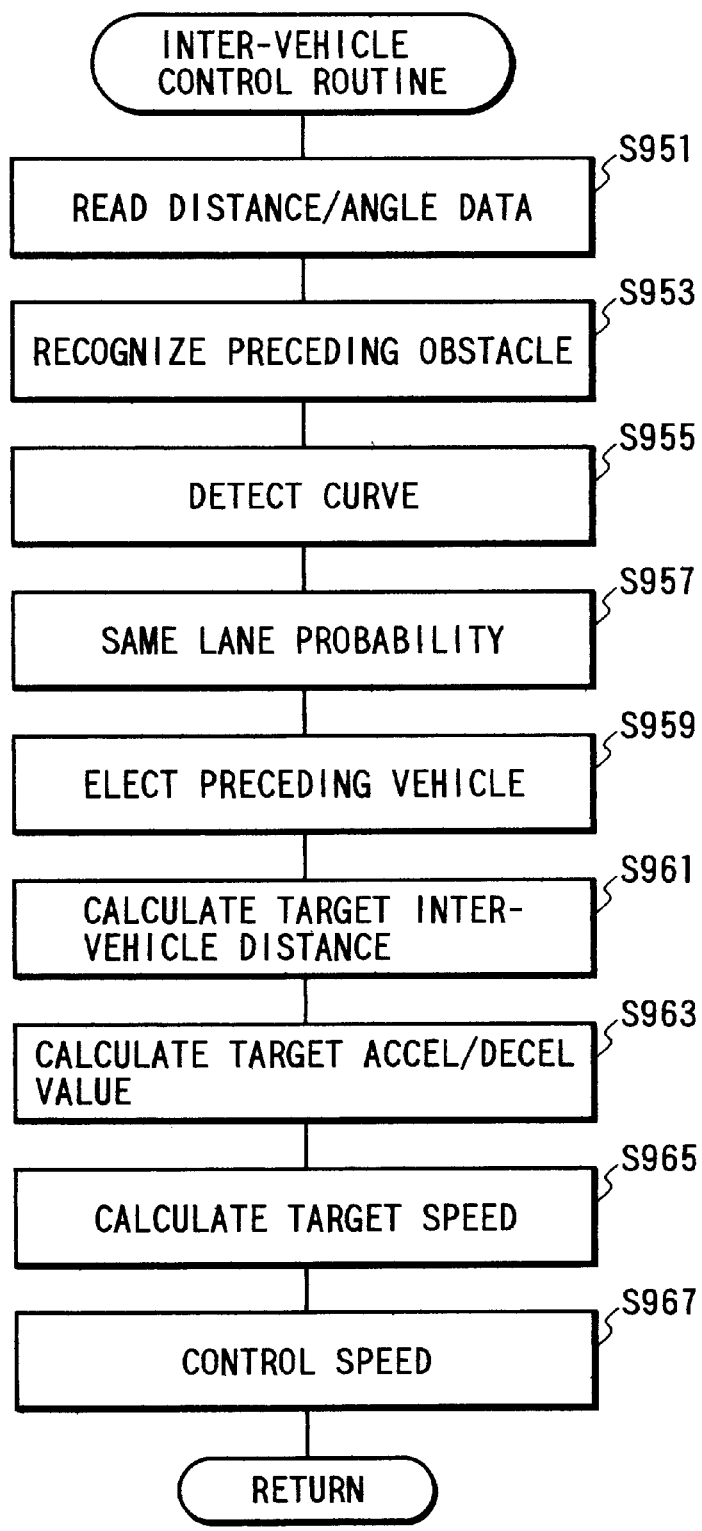
FIG. 13 is a flowchart showing an inter-vehicle distance control routine in the inter-vehicle distance control process.

FIG. 13 is a flowchart showing the details of the inter-vehicle control routine. The inter-vehicle control routine has a first step S951. S951 reads data representing a distance to and an angle of each of obstacles which are detected through the distance/angle measuring device 5 and corrected by an angle of the value θ shift. S953 following S951 executes a preceding obstacle recognition processing on the basis of the received data representing the distance to and angle of each of the detected obstacles. Specifically, S953 calculates the position and the speed of each of the detected obstacles relative to the subject vehicle. These calculations are made on the basis of the data derived from the object recognition block 45 and the relative speed calculation block 51.

S955 following S953 detects a curvature radius of a road along which the subject vehicle travels. Specifically, S955 reads the curvature radius R calculated or provided by the curvature radius calculation block 63. S957 following S955 determines, on the basis of the curvature radius R, a same lane probability that the detected obstacle is present on the same lane as the subject vehicle. Since S951 and S953 have determined the two-dimensional position of each of the detected obstacles, the same lane probability is calculated for each detected obstacle. After S957, S959 selects a preceding vehicle from among the detected obstacles on the basis of the results of the same lane probability calculation so that a distance to the selected preceding vehicle can be controlled.

After S959, S961 calculates a target distance to the preceding vehicle in response to an input from a driver of the subject vehicle, while S963 calculates a target acceleration/deceleration value. As shown in detail in FIG. 14, the target acceleration/deceleration calculation routine is executed on the basis of the distance data related to the selected preceding vehicle as follows.

Figure 14:
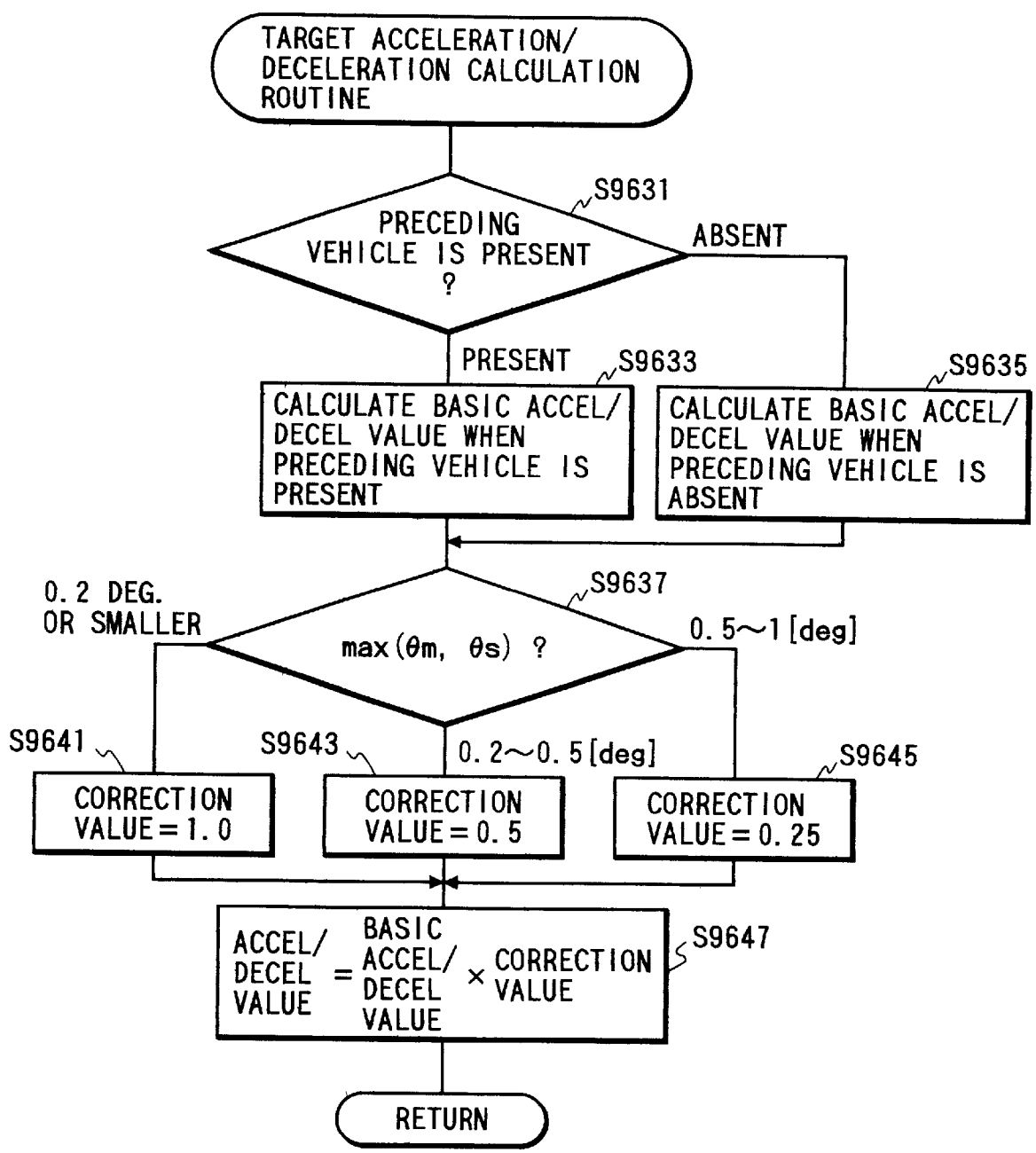
FIG. 14 is a flowchart showing an acceleration/deceleration calculation routine in the inter-vehicle distance control process.
Figure 15A:
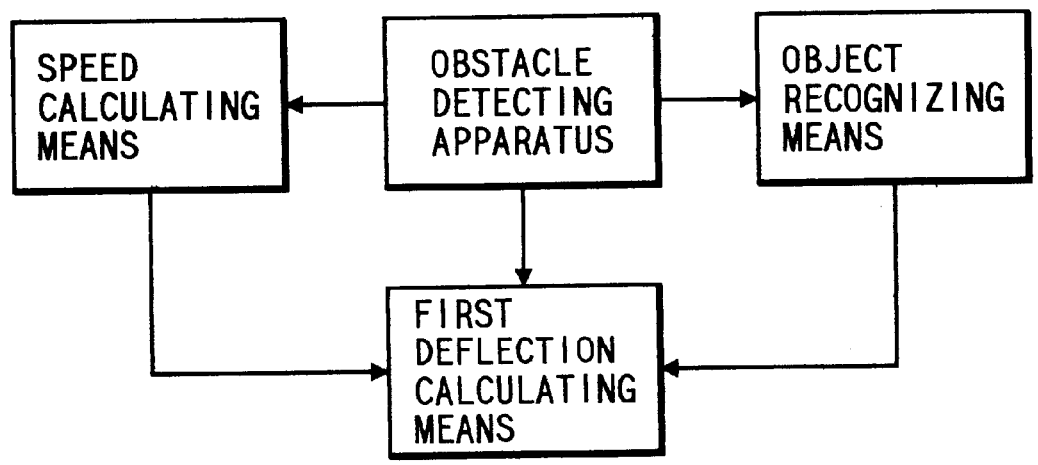
FIGS. 15A and 15B are block diagrams each showing an exemplary structure of the present invention.
Figure 15B:
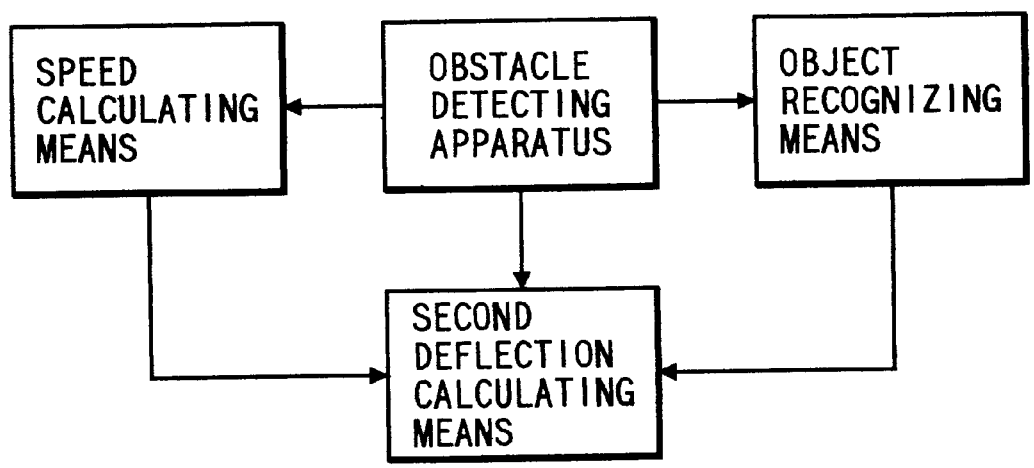

In FIG. 14, S9631 determines whether a preceding vehicle is present or absent. If the preceding vehicle is present, the program advances to S9633. Otherwise, the program advances to S9635.

S9633 calculates a basic acceleration/deceleration value when the preceding vehicle is present on the basis of both the deviation of the target inter-vehicle distance from the distance data related to the preceding vehicle and the speed of the preceding vehicle relative to the subject vehicle previously calculated. On the other hand, S9635 calculates a basic acceleration/deceleration value when the preceding vehicle is absent on the basis of required data such as data representing a distance to an angle of a target stationary object and the speed of the subject vehicle. After calculating the basic acceleration/deceleration value in S9633 or S9635, the program advances to S9637. S9637 determines the maximum value (θ m, θ s). As a result, if the maximum value (θ m, θ s) is smaller than 0.2 deg, the program advances to S9641 in which the correction value is set equal to 1. If the maximum value (θ m, θ s) is between 0.2 and 0.5 deg, the program advances to S9643 in which the correction value is set equal to 0.5. If the maximum value (θ m, θ s) is between 0.5 and 1.0 deg, the correction value is set equal to 0.25.

After setting the correction value in S9641, S9643 or S9645, the program advances to S9647. S9647 determines a target acceleration/deceleration value by multiplying the basic acceleration/deceleration value, provided by S9633 or S9635, and the correction value provided by S9641, S9643 or S9645. After the target acceleration/deceleration value is determined, the program returns to the inter-vehicle control routine of FIG. 13.

In FIG. 13, the program advances from S963 to S965. S965 calculates a current target speed of the subject vehicle on the basis of the current acceleration/deceleration value and the immediately-previous target speed calculated during the latest execution cycle of the program. S967 following S965 outputs a drive signal to an actuator such as the brake driver 19 or the throttle driver 21 so as to control the speed of the subject vehicle. The speed control is performed such that the actual speed of the subject vehicle is made approximate to the target speed. After that, the inter-vehicle control routine ends. The subject vehicle is thus controlled to travel maintaining a distance to the preceding vehicle at a constant value.

As previously described, the inter-vehicle distance control routine serves to control a distance between the subject vehicle and the preceding vehicle in accordance with the distance/angle data related to the preceding vehicle which has been corrected by an angle of the value θ shift, so that the control safety can be ensured. In the inter-vehicle distance control routine, the larger the maximum value (θ m, θ s), the smaller the correction value by which the basic acceleration/deceleration value is multiplied for reducing the acceleration/deceleration value. In the case where the optical axis of the transmitting/receiving section 31 is deflected, the larger the deflection, the smaller the acceleration/deceleration value will be. Therefore, the subject vehicle is prevented from being accelerated or decelerated excessively due to the deflection of optical axis, so that the subject vehicle can travel stably, thereby further improving the control safety.

In the case where the deflection of optical axis is too large to detect an obstacle or obstacles, or in the case where the deflection of optical axis changes suddenly (S917, S921), the inter-vehicle distance control is disabled. The former case has possibility of inaccurate the distance/angle data, while the latter case has possibility that something runs against the transmitting/receiving section 31 or near elements to cause deformation. In theses cases, it is undesirable to continue the inter-vehicle distance control processing. To this end, the inter-vehicle distance control routine stops control of the inter-vehicle distance, so that the control safety can be still more improved.

In the above embodiment, the object recognition block 45 corresponds to the object recognizing means and the width calculating means, the steering angle sensor 27 and the curvature radius calculation block 63 correspond to straight advancement determining means, the relative speed calculation block 51 corresponds to the speed calculating means, the transmitting/receiving section 31 corresponds to the transmitting means and receiving means, the distance/angle calculating section 33 corresponds to the distance calculating means, and the addresses D[1] to D[33] of the distance/angle calculating section 33 correspond to the storage means, respectively.

The optical axis correction block 61 includes S107 corresponding to the first deflection calculating means and S113 corresponding to the second deflection calculating means and the third deflection calculating means. The optical axis correction block 61 also includes S20 which has the step of calculating the average values av θ m and av θ s corresponding to the average value calculating means and the step of calculating the values σ m and σ s corresponding to the standard deviation calculating means. Steps S25, S33, S35, S42, S44, S52 and S54 following S20 corresponds to the deflection evaluating means. Further, the step of shifting the distance/angle data executed by the distance/angle data calculating section 33 and the step of altering the equation executed by the coordinate transformation block 41 correspond to the angle correcting means. In the warning judgment and cruise judgment block 55, S959 corresponds to the preceding vehicle selecting means, S961 to S967 correspond to the inter-vehicle distance control means, S97 and S9637 to S9647 correspond to control condition changing means, and 921 corresponds to the sudden-change detecting means, respectively.

Although the present invention was specified by the above embodiment, it is not limited thereby and other embodiments or modifications can be embodied without departing from the scope of the invention as set forth in the appended claims. For example, although both the values θ m and θ s are used in the embodiment for correcting the optical axis, either of the values may be used therefor. Further in the embodiment, although the contents of the data measured by the distance/angle measuring device 5 and supplied to the coordinate transformation block 41 are corrected on the basis of the value θ shift, the data in the transmitting/receiving section 31 may be altered or shifted in the same manner as that disclosed in Japanese published patent application No. 5-157843. Otherwise, the value θ shift may be only stored as data for manually adjusting the position of the transmitting/receiving section 31 of the distance/angle measuring device 5 during maintenance of the vehicle. Furthermore, in the inter-vehicle distance control process, although the acceleration/deceleration value is reduced in response to the deflection value, the deflection of optical axis may be corrected by directing the acceleration/deceleration value to the decelerated side, or by increasing a target inter-vehicle distance.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. An apparatus for adjusting a deflection of central axis of an obstacle detecting apparatus mounted on a vehicle and operative to radiate a transmission wave over a given angular range from a given central axis to the width direction of the vehicle and to detect a distance to and an angle of an obstacle in response to a reflected wave from the obstacle, comprising:

object recognizing means for determining whether the obstacle is a stationary object or a moving object on the basis of changes in distance to and angle of the obstacle detected by the obstacle detecting apparatus;

speed calculating means for calculating a vector representing a speed of the obstacle relative to the vehicle;

first deflection calculating means, for when a target obstacle is selected from among obstacles detected by the obstacle detecting apparatus under conditions that the target obstacle has been recognized as a moving object by said object recognizing means and the relative speed thereof calculated by said speed calculating means falls within a given range, calculating the deflection of central axis of the obstacle detecting apparatus relative to the vehicle based upon an angle of the target obstacle; and deflection adjusting means for adjusting the deflection of central axis of the obstacle detecting apparatus calculated by said deflection calculating means.

2. An apparatus for adjusting a deflection of central axis of an obstacle detecting apparatus mounted on a vehicle and operative to radiate a transmission wave over a given angular range from a given central axis to the width direction of the vehicle and to detect a distance to and an angle of an obstacle in response to a reflected wave from the obstacle, comprising:

object recognizing means for determining whether the obstacle is a stationary object or a moving object on the basis of changes in distance to and angle of the obstacle detected by the obstacle detecting apparatus;

speed calculating means for calculating a vector representing a speed of the obstacle relative to the vehicle;

second deflection calculating mean, for when a target obstacle is selected from among obstacles detected by the obstacle detecting apparatus under conditions that the target obstacle has been recognized as a stationary object by said object recognizing means and the distance thereto detected by the obstacle detecting apparatus is less than a given value, calculating the deflection of central axis of the obstacle detecting apparatus relative to the vehicle based upon the direction of the vector representing the relative speed of the target obstacle calculated by said speed calculating means; and deflection adjusting means for adjusting the deflection of central axis of the obstacle detecting apparatus calculated by said deflection calculating means.

3. An apparatus for calculating a deflection of central axis of an obstacle detecting apparatus mounted on a vehicle and operative to radiate a transmission wave over a given angular range from a given central axis to a width direction of the vehicle and to detect a distance to and an angle of a target obstacle in response to a reflected wave from the obstacle, the apparatus comprising:

object recognizing means for determining whether the target obstacle is stationary or moving based upon changes in the distance and the angle of the target obstacle detected by the obstacle detecting apparatus;

speed calculating means for calculating a speed of the target obstacle relative to the vehicle;

first deflection calculating means calculating the deflection of central axis of the obstacle detecting apparatus relative to the vehicle on the basis of the angle of the obstacle, calculating when the target obstacle, selected from obstacles detected by the obstacle detecting apparatus, has been determined to be moving and the relative speed of the target obstacle falls within a given range; and angle correcting means for correcting the angle of the target obstacle detected by the obstacle detecting apparatus based upon the calculated deflection.

4. An apparatus for calculating a deflection of central axis of an obstacle detecting apparatus mounted on a vehicle and operative to radiate a transmission wave over a given angular range from a given central axis to a width direction of the vehicle and to detect a distance to and an angle of an obstacle in response to a reflected wave from the obstacle, the apparatus comprising:

object recognizing means for determining whether the obstacle is stationary or moving based upon changes in the distance and the angle of the obstacle detected by the obstacle detecting apparatus;

speed calculating means for calculating a vector representing a speed of the obstacle relative to the vehicle;

second deflection calculating means calculating the deflection of central axis of the obstacle detecting apparatus relative to the vehicle based upon direction of the calculated vector, calculating when the obstacle has been determined to be stationary and the distance thereto detected by the obstacle detecting apparatus is less than a given value; and angle correcting means for correcting the angle of the obstacle detected by the obstacle detecting apparatus on the basis of the calculated deflection.

5. An inter-vehicle distance control apparatus including an obstacle detecting apparatus for a subject vehicle radiating a transmission wave over a given angular range from a given central axis to a width direction of the subject vehicle and to detect a distance to and an angle of an obstacle in response to a reflected wave from the obstacle, preceding vehicle selecting means for selecting a preceding vehicle from among obstacles detected by said obstacle detecting apparatus, the preceding vehicle corresponding to a target obstacle for which inter-vehicle distance control should be executed, and inter-vehicle distance control means for controlling speed of the subject vehicle to maintain a distance between the subject vehicle and the preceding vehicle, said inter-vehicle distance control apparatus comprising:

object recognizing means for determining whether the target obstacle is stationary or moving based upon changes in the distance and the angle detected by the obstacle detecting apparatus;

speed calculating means for calculating a speed of the target obstacle relative to the subject vehicle;

first deflection calculating means calculating the deflection of central axis of the obstacle detecting apparatus relative to the vehicle on the basis of the angle of the obstacle, calculating when the target obstacle, selected from obstacles detected by the obstacle detecting apparatus, has been determined to be moving and the relative speed of the target obstacle falls within a given range; and control condition changing means for changing a control condition of said inter-vehicle distance control means based upon the calculated deflection.

6. An inter-vehicle distance control apparatus including an obstacle detecting apparatus for a subject vehicle radiating a transmission wave over a given angular range from a given central axis to a width direction of the subject vehicle and to detect a distance to and an angle of an obstacle in response to a reflected wave from the obstacle, preceding vehicle selecting means for selecting a preceding vehicle from among obstacles detected by said obstacle detecting apparatus, the preceding vehicle corresponding to a target obstacle for which inter-vehicle distance control should be executed, and inter-vehicle distance control means for controlling speed of the subject vehicle to maintain a distance between the subject vehicle and the preceding vehicle, said inter-vehicle distance control apparatus comprising:

object recognizing means for determining whether the target obstacle is stationary or moving based upon changes in the distance and the angle detected by the obstacle detecting apparatus;

speed calculating means for calculating a vector representing a speed of the obstacle relative to the vehicle;

second deflection calculating means calculating the deflection of central axis of the target obstacle detecting apparatus relative to the vehicle based upon direction of the calculated vector, calculating when the obstacle has been determined to be stationary and the distance thereto detected by the obstacle detecting apparatus is less than a given value; and control condition changing means for changing a control condition of said inter-vehicle distance control means based upon the calculated deflection.

7. An apparatus as set forth in claim 3 or 4 or 5 further comprising third deflection calculating means, when a target obstacle is selected from among obstacles detected by the obstacle detecting apparatus under a condition that the target obstacle has been recognized as a stationary object by said object recognizing means, which calculates the deflection of central axis of the obstacle detecting apparatus relative to the vehicle on the basis of the direction of the vector representing the relative speed of the target obstacle calculated by said speed calculating means.

8. An apparatus as set forth in claim 3 or 5, wherein when a target obstacle is selected, from among obstacles continuously detected for a given time period or more by the obstacle detecting apparatus, under conditions the target obstacle has been recognized as a moving object by said object recognizing means and the components of the vector representing the relative speed thereof calculated by said speed calculating means falls within a given range, said first deflection calculating means calculates the deflection of central axis of the obstacle detecting apparatus relative to the vehicle on the basis of the angle of the target obstacle detecting by the obstacle detecting apparatus.

9. An apparatus as set forth in claim 3 or 5, the apparatus further comprising width calculating means for calculating a width of an obstacle on the basis of the distance to and angle of the obstacle detected by the obstacle detecting apparatus, wherein when a target obstacle is selected from among obstacles detected by the obstacle detecting apparatus under conditions that the target obstacle has been recognized as a moving object by said object recognizing means, the components of the vector representing the relative speed thereof calculated by said speed calculating means falls within a given range, and the width thereof calculated by said width calculating means falls within a given range, said first deflection calculating means calculates the deflection of central axis of the obstacle detecting apparatus relative to the vehicle on the basis of the angle of the target obstacle detected by the obstacle detecting apparatus.

10. An apparatus as set forth in claim 3 or 5, the apparatus further comprising:

average value calculating means for calculating a mean or average value of a plurality of deflections of central axis each of which is individually calculated as a result of plural calculation cycles of said first deflection calculating means;

standard deviation calculating means for calculating a standard deviation of the plurality of deflections; and a deflection evaluating means for evaluating the average value of the plurality of deflections to be a reliable value for the deflection of central axis of the obstacle detecting apparatus relative to the vehicle when the standard deviation is smaller than a given value and the number of deflections upon which the average value and the standard deviation are calculated is a given number or more, or for evaluating the value of each deflection and the average value of the plurality of deflections to be unreliable values when the standard deviation is the given value or larger and the number of deflections is less than the given number.

11. An apparatus for calculating a deflection of central axis of an obstacle detecting apparatus for a vehicle, which includes either said second deflection calculating means or said third deflection calculating means as set forth in claim 4 or 6, the apparatus further comprising:

average value calculating means for calculating a mean or average value of a plurality of deflections of central axis each of which is individually calculated as a result of plural calculation cycles of said second or third deflection calculating means;

standard deviation calculating means for calculating a standard deviation of the plurality of deflections; and deflection evaluating means for evaluating the average value of the plurality of deflections to be a reliable value for the deflection of central axis of the obstacle detecting apparatus relative to the vehicle when the standard deviation is smaller than a given value and the number of deflections upon which the average value and the standard deviation are calculated is a given number or more, or for evaluating the value of each deflection and the average value of the plurality of deflections to be unreliable values when the standard deviation is the given value or larger and the number of deflections is less than the given number.

12. An apparatus for calculating a deflection of central axis of an obstacle detecting apparatus for a vehicle, which includes both said first deflection calculating means and said third deflection calculating means as set forth in claim 7, wherein when an absolute value of the deflection calculated by said third deflection calculating means is a given value or larger, the value of the deflection calculated by said first deflection calculating means is neglected.

13. An apparatus as set forth in claim 7, the apparatus further comprising straight advancement determining means for determining whether or not the vehicle is traveling straight, wherein said first, second or third deflection calculating means calculates the deflection only when said straight advancement determining means determines that the vehicle is traveling straight.

14. An apparatus as set forth in claim 3 or 4, the obstacle detecting apparatus comprising:

transmitting means for radiating a transmission wave every given angle in a scanning manner;

receiving means for receiving a reflected wave from an obstacle;

distance calculating means for calculating a distance to the obstacle on the basis of an interval of time between the moment of transmission of the transmission wave by said transmitting means and the moment of reception of the reflected wave by said receiving means; and storage means for storing data representing the distance to the obstacle provided by said distance calculating means with maintaining the one-to-one correspondence between the distance to the obstacle and the angle of radiation at which the corresponding transmission wave is radiated, such that said angle correcting means corrects the angle of the obstacle relative to the vehicle by changing the correspondence or the relation between the distance to the obstacle and the angle of radiation stored in said storage means.

15. An apparatus as set forth in claim 3 or 4, the apparatus further comprising coordinate transforming means for transforming the distance to and angle of the obstacle detected by the obstacle detecting apparatus into a position of orthogonal coordinates by solving a given equation for coordinate transformation, such that the angle correcting means corrects the angle of the obstacle relative to the vehicle by changing or alternating the equation for coordinate transformation provided by said coordinate transformation means.

16. An inter-vehicle distance control system as set forth in claim 5 or 6, wherein said control condition changing means changes the value of acceleration/deceleration of the subject vehicle to be adjusted by said inter-vehicle distance control means in response to the deflection calculated by said deflection of central axis calculating apparatus.

17. An inter-vehicle distance control system as set forth in claim 16, wherein said control condition changing means reduces the value of the acceleration/deceleration of the subject vehicle to be adjusted by said inter-vehicle distance control means in response to the deflection calculated by said deflection of central axis calculating apparatus.

18. An inter-vehicle distance control system as set forth in claim 5 or 6, wherein said control condition changing means stops the control processing to be executed by said inter-vehicle distance control means in response to the value of the deflection calculated by said deflection of central axis calculating apparatus.

19. An inter-vehicle distance control system as set forth in claim 18, further comprising sudden-change detecting means for detecting a sudden change in deflection of central axis of said obstacle detecting apparatus, such that said control condition changing means stops the control processing to be executed by said inter-vehicle distance control means when a sudden change in deflection of central axis of said obstacle detecting apparatus is detected by said sudden-change detecting means.

* * * * *